United States Patent
Ward et al.

(10) Patent No.: US 12,495,995 B2
(45) Date of Patent: Dec. 16, 2025

(54) MEASUREMENT OF GLUCOSE NEAR AN INSULIN DELIVERY CATHETER BY MINIMIZING THE ADVERSE EFFECTS OF INSULIN PRESERVATIVES: ALTERNATIVE LIGANDS AND REDOX MEDIATOR METALS

(71) Applicant: Pacific Diabetes Technologies Inc, Portland, OR (US)

(72) Inventors: William Kenneth Ward, Portland, OR (US); Robert S. Cargill, Portland, OR (US); Gabriel Heinrich, Portland, OR (US); Sheila Benware, Happy Valley, OR (US); Mark Vreeke, Irvine, CA (US); Joseph D. Kowalski, San Diego, CA (US); Thomas Seidl, Wilsonville, OR (US)

(73) Assignee: PACIFIC DIABETES TECHNOLOGIES, INC, Omaha, NE (US)

( * ) Notice: Subject to any disclaimer, the term of this patent is extended or adjusted under 35 U.S.C. 154(b) by 0 days.

(21) Appl. No.: 18/112,617

(22) Filed: Feb. 22, 2023

(65) Prior Publication Data
US 2023/0329593 A1  Oct. 19, 2023

Related U.S. Application Data

(63) Continuation of application No. PCT/US2021/046894, filed on Aug. 20, 2021.
(Continued)

(51) Int. Cl.
*A61B 5/145* (2006.01)
*A61B 5/1486* (2006.01)
(Continued)

(52) U.S. Cl.
CPC ...... *A61B 5/14532* (2013.01); *A61B 5/14865* (2013.01); *A61B 5/4839* (2013.01); *A61M 5/1723* (2013.01); *A61M 2230/201* (2013.01)

(58) Field of Classification Search
CPC ............ A61B 5/14532; A61B 5/14865; A61B 5/4839; A61M 5/1723; A61M 2230/201
See application file for complete search history.

(56) References Cited

U.S. PATENT DOCUMENTS

| 5,165,407 A | 11/1992 | Wilson et al. |
| 5,174,291 A | 12/1992 | Schoonen et al. |

(Continued)

FOREIGN PATENT DOCUMENTS

| CA | 2347378 A1 | 4/2000 |
| EP | 1327881 A1 | 7/2003 |

(Continued)

OTHER PUBLICATIONS

Katsunobu Yamamoto, et al. Evaluation of an amperometric glucose biosensor based on a ruthenium complex mediator of low redox potential, Talanta, vol. 66, Issue 5, 2005, pp. 1175-1180, (Year: 2005).*

(Continued)

*Primary Examiner* — Eric J Messersmith
(74) *Attorney, Agent, or Firm* — Wilson Sonsini Goodrich & Rosati

(57) ABSTRACT

A device for delivery of an insulin or insulin analog formulation and measurement of subcutaneous glucose concentration may comprise a hollow tube, and an amperometric glucose sensor located proximal to a distal end of the hollow tube. The amperometric glucose sensor may comprise a redox mediator and an enzyme comprising glucose oxidase or glucose dehydrogenase. An applied bias potential may allow an electrode layer of the amperometric glucose sensor (Continued)

to undergo substantially no electropolymerization of an excipient of the insulin or insulin analog formulation during continuous operation of amperometric glucose sensor. A sensitivity of the amperometric glucose sensor to the subcutaneous glucose concentration may be maintained in presence of the insulin or insulin analog formulation.

37 Claims, 10 Drawing Sheets

Related U.S. Application Data

(60) Provisional application No. 63/069,088, filed on Aug. 23, 2020.

(51) Int. Cl.
  *A61B 5/00* (2006.01)
  *A61M 5/172* (2006.01)

(56) References Cited

U.S. PATENT DOCUMENTS

| | | |
|---|---|---|
| 5,176,632 A | 1/1993 | Bernardi |
| 5,431,160 A | 7/1995 | Wilkins |
| 5,476,776 A | 12/1995 | Wilkins |
| 5,868,711 A | 2/1999 | Kramer et al. |
| 5,936,061 A | 8/1999 | Andersson et al. |
| 5,972,199 A | 10/1999 | Heller et al. |
| 6,032,059 A | 2/2000 | Henning et al. |
| 6,210,326 B1 | 4/2001 | Ehwald |
| 6,605,048 B1 | 8/2003 | Levin et al. |
| 6,613,205 B1 | 9/2003 | Steiner et al. |
| 6,613,379 B2 | 9/2003 | Ward et al. |
| 6,695,958 B1 | 2/2004 | Adam et al. |
| 6,814,845 B2 | 11/2004 | Wilson et al. |
| 6,892,085 B2 | 5/2005 | McIvor et al. |
| 7,003,336 B2 | 2/2006 | Holker et al. |
| 7,074,307 B2 | 7/2006 | Simpson et al. |
| 7,120,483 B2 | 10/2006 | Russell et al. |
| 7,134,999 B2 | 11/2006 | Brauker et al. |
| 7,146,202 B2 | 12/2006 | Ward et al. |
| 7,228,162 B2 | 6/2007 | Ward et al. |
| 7,338,465 B2 | 3/2008 | Patton |
| 7,379,765 B2 | 5/2008 | Petisce et al. |
| 7,399,277 B2 | 7/2008 | Saidara et al. |
| 7,471,972 B2 | 12/2008 | Rhodes et al. |
| 7,499,738 B2 | 3/2009 | Gerber et al. |
| 7,529,574 B2 | 5/2009 | Jansen et al. |
| 7,534,330 B2 | 5/2009 | Yu et al. |
| 7,799,191 B2 | 9/2010 | Yu et al. |
| 7,826,879 B2 | 11/2010 | Hoss et al. |
| 7,896,809 B2 | 3/2011 | Simpson et al. |
| 7,901,354 B2 | 3/2011 | Shults et al. |
| 7,905,833 B2 | 3/2011 | Brister et al. |
| 7,949,381 B2 | 5/2011 | Brister et al. |
| 7,967,752 B2 | 6/2011 | Ocvirk et al. |
| 8,000,901 B2 | 8/2011 | Brauker et al. |
| 8,017,314 B2 | 9/2011 | Abel et al. |
| 8,060,174 B2 | 11/2011 | Simpson et al. |
| 8,133,178 B2 | 3/2012 | Brauker et al. |
| 8,155,722 B2 | 4/2012 | Feldman et al. |
| 8,160,669 B2 | 4/2012 | Brauker et al. |
| 8,170,803 B2 | 5/2012 | Kamath et al. |
| 8,187,433 B2 | 5/2012 | Ward et al. |
| 8,231,531 B2 | 7/2012 | Brister et al. |
| 8,268,143 B2 | 9/2012 | Liu et al. |
| 8,277,636 B2 | 10/2012 | Sode |
| 8,277,713 B2 | 10/2012 | Petisce et al. |
| 8,326,393 B2 | 12/2012 | Kotzan et al. |
| 8,373,421 B2 | 2/2013 | Lindegger et al. |
| 8,483,791 B2 | 7/2013 | Brister et al. |
| 8,483,793 B2 | 7/2013 | Simpson et al. |
| 8,509,871 B2 | 8/2013 | Rhodes et al. |
| 8,512,276 B2 | 8/2013 | Talbot et al. |
| 8,515,518 B2 | 8/2013 | Ouyang et al. |
| 8,515,519 B2 | 8/2013 | Brister et al. |
| 8,527,024 B2 | 9/2013 | Staib et al. |
| 8,543,184 B2 | 9/2013 | Boock et al. |
| 8,548,551 B2 | 10/2013 | Kamath et al. |
| 8,571,625 B2 | 10/2013 | Kamath et al. |
| 8,577,438 B2 | 11/2013 | Kube et al. |
| 8,608,922 B2 | 12/2013 | Papadimitrakopoulos et al. |
| 8,620,398 B2 | 12/2013 | Feldman et al. |
| 8,650,751 B2 | 2/2014 | Feldman et al. |
| 8,679,016 B2 | 3/2014 | Mastrototaro et al. |
| 8,700,114 B2 | 4/2014 | Gottlieb et al. |
| 8,812,072 B2 | 8/2014 | Brister et al. |
| 8,886,273 B2 | 11/2014 | Li et al. |
| 8,906,210 B2 | 12/2014 | Curry |
| 9,131,885 B2 | 9/2015 | Simpson et al. |
| 9,248,232 B2 | 2/2016 | Yodfat et al. |
| 9,693,713 B2 | 7/2017 | Pace et al. |
| 10,780,222 B2 | 9/2020 | Ward et al. |
| 11,135,369 B2 | 10/2021 | Ward et al. |
| 2005/0118726 A1 | 6/2005 | Schultz et al. |
| 2006/0000710 A1 | 1/2006 | Weidenhaupt et al. |
| 2006/0025717 A1 | 2/2006 | Zimmermann et al. |
| 2006/0263839 A1 | 11/2006 | Ward et al. |
| 2007/0093752 A1 | 4/2007 | Zhao et al. |
| 2007/0191702 A1 | 8/2007 | Yodfat et al. |
| 2007/0219597 A1 | 9/2007 | Kamen et al. |
| 2007/0292896 A1 | 12/2007 | Strano et al. |
| 2009/0062767 A1 | 3/2009 | Van Antwerp et al. |
| 2009/0298104 A1 | 12/2009 | Liu et al. |
| 2010/0256593 A1 | 10/2010 | Yodfat et al. |
| 2010/0326843 A1 | 12/2010 | Zhang et al. |
| 2010/0331728 A1 | 12/2010 | Zhang et al. |
| 2011/0021889 A1 | 1/2011 | Hoss et al. |
| 2011/0054390 A1 | 3/2011 | Searle et al. |
| 2011/0054399 A1 | 3/2011 | Chong et al. |
| 2011/0180405 A1 | 7/2011 | Chinnayelka et al. |
| 2011/0288388 A1 | 11/2011 | Shah et al. |
| 2012/0046533 A1 | 2/2012 | Voskanyan et al. |
| 2012/0053514 A1 | 3/2012 | Robinson et al. |
| 2012/0138484 A1 | 6/2012 | Bommakanti et al. |
| 2012/0209204 A1 | 8/2012 | Gray et al. |
| 2012/0277667 A1* | 11/2012 | Yodat .................. A61B 5/1451 604/65 |
| 2012/0316412 A1 | 12/2012 | Heller et al. |
| 2013/0040404 A1 | 2/2013 | Crane et al. |
| 2013/0060106 A1 | 3/2013 | Aasmul et al. |
| 2013/0131482 A1 | 5/2013 | Fedder et al. |
| 2014/0163346 A1 | 6/2014 | Pesantez et al. |
| 2014/0288494 A1 | 9/2014 | Brister et al. |
| 2014/0296823 A1 | 10/2014 | Ward et al. |
| 2014/0367246 A1 | 12/2014 | Shah et al. |
| 2015/0374905 A1* | 12/2015 | Yodfat ................ A61M 5/1723 604/504 |
| 2016/0000360 A1 | 1/2016 | Feldman |
| 2016/0128636 A1 | 5/2016 | Fedder et al. |
| 2016/0136357 A1 | 5/2016 | Yang |
| 2016/0279325 A1 | 9/2016 | Searle et al. |
| 2016/0354542 A1* | 12/2016 | Ward .................. A61M 5/158 |
| 2016/0375104 A1 | 12/2016 | Joseph et al. |
| 2020/0245913 A1 | 8/2020 | Dalal et al. |
| 2021/0059602 A1 | 3/2021 | Gough et al. |
| 2022/0080123 A1 | 3/2022 | Ward et al. |
| 2022/0265210 A1 | 8/2022 | Cargill et al. |
| 2022/0386905 A1 | 12/2022 | Jacobs et al. |

FOREIGN PATENT DOCUMENTS

| | | |
|---|---|---|
| EP | 3982829 A1 | 4/2022 |
| JP | 2009514589 A | 4/2009 |
| JP | 2009525831 A | 7/2009 |
| JP | 2010531169 A | 9/2010 |
| JP | 2010537732 A | 12/2010 |
| JP | 2011507556 A | 3/2011 |
| JP | 2014507225 A | 3/2014 |
| JP | 2022536843 A | 8/2022 |
| KR | 20190116388 A | 10/2019 |
| WO | WO-0064492 A1 | 11/2000 |

(56) References Cited

FOREIGN PATENT DOCUMENTS

| WO | WO-0239086 A2 | 5/2002 |
|---|---|---|
| WO | WO-2007052277 A1 | 5/2007 |
| WO | WO-2008038274 A1 | 4/2008 |
| WO | WO-2008078319 A1 | 7/2008 |
| WO | WO-2012108954 A2 | 8/2012 |
| WO | WO-2014035672 A2 | 3/2014 |
| WO | WO-2016196516 A1 | 12/2016 |
| WO | WO-2020252324 A1 | 12/2020 |

OTHER PUBLICATIONS

European Examination Report dated Feb. 17, 2025 issued in European Patent Application No. EP20821954.3.
Office Action dated Oct. 23, 2024 issued in U.S. Appl. No. 17/410,866.
U.S. Appl. No. 18/907,846 Office Action dated Dec. 16, 2024.
EP20821954.3 Extended European Search Report dated Jun. 29, 2023.
EP21862437.7 Extended Search Report dated Aug. 16, 2024.
Ward; Kenneth W. et al.: An Amperometric Glucose Sensor Integrated into an Insulin Delivery Cannula: In Vitro and In Vivo Evaluation. Diabetes Technology Therapeutics 19(4):226-236 (2017). doi: 10.1089/dia.2016.0407.
U.S. Appl. No. 17/410,866 Office Action dated Oct. 23, 2024.
Co-pending U.S. Appl. No. 18/907,846, inventors Ward; William Kenneth et al., filed Oct. 7, 2024.
U.S. Appl. No. 17/549,232 Office Action dated May 20, 2025.
U.S. Appl. No. 17/684,015 Office Action dated Jun. 20, 2025.
U.S. Appl. No. 18/907,846 Notice of Allowance dated Apr. 14, 2025.
U.S. Appl. No. 19/247,755 Office Action dated Jul. 18, 2025.
U.S. Appl. No. 19/247,768 Office Action dated Jul. 21, 2025.
Alzoubi et al., Experimental and Analytical Studies on the High Cycle Fatigue of Thin Film Metal on PET Substrate for Flexible Electronics Applications. IEEE Transactions on Components, Packaging, and Manufacturing 1: 43-51 (2011).
International Search Report and Written Opinion issued in PCT/US2021/046894 on Nov. 26, 2021.
JDRF CGM Study Group. JDRF randomized clinical trial to assess the efficacy of real-time continuous glucose monitoring in the management of type 1 diabetes: research design and methods. Diabetes Technol Ther 10(4):310-321 (2008).
Lavvafi et al., Flex bending fatigue testing of wires, foils and ribbons. Materials Sci and Engineering 1:123-130 (2014).
Matsui et al., Modeling high adsorption capacity and kinetics of organic macromolecules on super-powdered activated carbon. Water Res 45(4):1720-1728 (2011).
Ohara et al., "Wired" enzyme electrodes for amperometric letermination of glucose or lactate in the presence of interfering substances. Anal Chem 66(15):2451-2457 (1994).
PCT/US2016/035102 International Search Report and Written Opinion dated Oct. 11, 2016.
PCT/US2020/037511 International Search Report and Written Opinion dated Sep. 21, 2020.
PCT/US2021/046894 International Search Report and Written Opinion dated Nov. 26, 2021 (Pub. No. WO2022046557).
Peel et al., Reminder: cresol and phenol preservatives interfere with analysis for glucose with the YSI Analyzer. Clinical Chemistry 29(8):1558-1559 (1983).
Resalat et al., Adaptive Control of an Artificial Pancreas Using Model Identification, Adaptive Postprandial Insulin Delivery, and Heart Rate and Accelerometry as Control Inputs. J Diabetes Sci Technol. Nov. 2019;13(6):1044-1053. doi: 10.1177/1932296819881467. Epub Oct. 9, 2019. PMID: 31595784; PMCID: PMC6835177.
U.S. Appl. No. 16/992,772 Non-Final Office Action dated Sep. 18, 2020.
U.S. Appl. No. 15/169,432 Office Action dated Apr. 2, 2019.
U.S. Appl. No. 15/169,432 Office Action dated Dec. 18, 2018.
Weber, et al. Phenolic excipients of insulin formulations induce cell death, pro-inflammatory signaling and MCP-1 release. Toxicol Rep. 2:194-202 (2015).
First Office Action dated Sep. 2, 2025 issued in European Patent Application No. 21 862 437.7.

\* cited by examiner

FIG. 10

18 — Etchant removes exposed Ag where photoresist is absent.

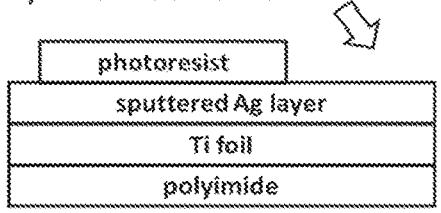

19 — Photoresist is then stripped, revealing the Ag electrode pattern.

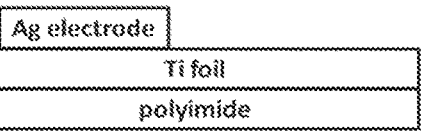

20 — Photoresist is removed where Pt is needed. Pt is then sputtered, and all photoresist is removed, which also removes Pt sputtered onto photoresist.

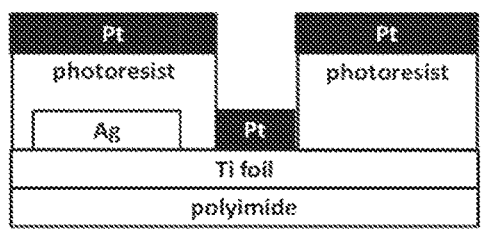

21 — Stripping the photoresist reveals the pattern for the Pt electrode.

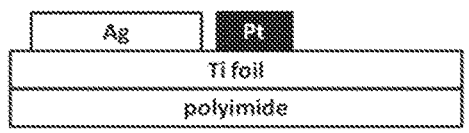

22 — Photoresist is removed wherever the Ti foil is to be removed by wet etchant, then photoresist is stripped to expose the finished electrodes.

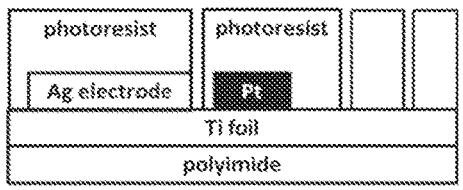

23 — Photoresist is removed, revealing the Ti pattern.

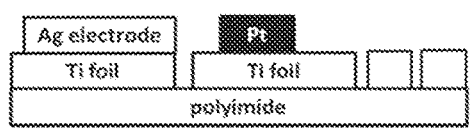

MEASUREMENT OF GLUCOSE NEAR AN INSULIN DELIVERY CATHETER BY MINIMIZING THE ADVERSE EFFECTS OF INSULIN PRESERVATIVES: ALTERNATIVE LIGANDS AND REDOX MEDIATOR METALS

CROSS-REFERENCE

This application is a continuation of International Application No. PCT/US2021/046894, filed Aug. 20, 2021, which claims the benefit of U.S. Provisional Application No. 63/069,088, filed Aug. 23, 2020, each of which is incorporated by reference herein in its entirety.

BACKGROUND

Subjects with diabetes may be at risk of developing complications, such as kidney disease, eye disease, cardiovascular disease and foot/nerve disease. It may be more difficult to control glucose levels in those subjects who require insulin treatment as compared to those who do not. Subjects with Type 1 Diabetes (T1D) may require insulin, and many such subjects have insulin delivered using a continuous pump, which allows precise, regulated delivery of insulin 24 hours per day.

SUMMARY

A valuable technique in managing T1D is Continuous Glucose Monitoring (GCM), in which a subcutaneously-inserted sensor provides interstitial glucose data to the user every few minutes. For example, JDRF-sponsored trials showed that subjects of all ages who used CGM on a regular basis experience better glycemic control than non-users (e.g., as measured by hemoglobin A1C (A1C)). However, many subjects may find CGM usage cumbersome and many may use CGM only sporadically. Not surprisingly, when used sporadically or rarely, CGM usage may not lead to better glycemic control.

Daily life may be difficult for those who regularly use both an insulin pump and CGM. Such individuals may be required to indwell two through-the-skin devices, which may increase the risk of pain, infection and other side effects compared to a single device. Persons with T1D may carry multiple devices on the body, for example, a pump and/or syringes, a CGM receiver, a vial of insulin, a blood glucose monitor for calibrating the CGM, and blood glucose monitoring strips and lancets. The multiplicity of devices may lead to a situation referred to as "device burden," which may lead to frustration, anger, and may cause a patient to choose among devices rather than utilizing all the devices that can improve his or her health.

Recognizing challenges encountered in clinical care and management because of issues regarding device burden, the present disclosure addresses an unmet need to integrate a CGM and insulin pump cannula into a single device.

Manufacturers' instructions may state that a subcutaneous glucose sensor must be located far away from the insulin pump cannula site. In support of this statement, during pig studies, we found that current insulin formulations markedly interfere with currently-available hydrogen peroxide-measuring sensors. More specifically, we found that the preservatives in the formulations, such as phenol and m-cresol, are electroactive and interfere with CGM.

The present disclosure provides devices and methods for use of same, in which a glucose sensor can be successfully integrated with the insulin cannula. Such glucose sensors and insulin cannulas may be described by, for example, U.S. Pat. No. 10,780,222, which disclosed osmium as a redox mediator element and pyridine-based and imidazole-based coordinating ligands bound to the osmium. Devices and methods of the present disclosure may use alternative metals, each of which can be used as a redox mediator, and alternative coordinating ligands.

In an aspect, the present disclosure provides a device for delivery of an insulin or insulin analog formulation and measurement of subcutaneous glucose concentration, comprising: a hollow tube comprising a proximal end and a distal end, wherein the proximal end is in fluid communication with a source of the insulin or insulin analog formulation, wherein the distal end is configured to deliver the insulin or insulin analog formulation subcutaneously, wherein the insulin or insulin analog formulation comprises an excipient comprising a phenol or cresol; and an amperometric glucose sensor located no more than a pre-determined distance away from the distal end, wherein the amperometric glucose sensor comprises: an electrode layer comprising at least one indicating electrode, wherein the electrode layer underlies a redox-catalytic layer comprising (1) a redox mediator comprising a metal compound covalently bound to a ligand, and (2) an enzyme comprising glucose oxidase or glucose dehydrogenase.

In some embodiments, the amperometric glucose sensor is located no more than 15 millimeters (mm) away from the distal end. In some embodiments, the amperometric glucose sensor is located no more than 14 mm away from the distal end. In some embodiments, the amperometric glucose sensor is located no more than 13 mm away from the distal end. In some embodiments, the amperometric glucose sensor is located no more than 12 mm away from the distal end. In some embodiments, the amperometric glucose sensor is located no more than 11 mm away from the distal end. In some embodiments, the amperometric glucose sensor is located no more than 10 mm away from the distal end. In some embodiments, the amperometric glucose sensor is located no more than 9 mm away from the distal end. In some embodiments, the amperometric glucose sensor is located no more than 8 mm away from the distal end. In some embodiments, the amperometric glucose sensor is located no more than 7 mm away from the distal end. In some embodiments, the amperometric glucose sensor is located no more than 6 mm away from the distal end. In some embodiments, the amperometric glucose sensor is located no more than 5 mm away from the distal end. In some embodiments, the amperometric glucose sensor is located no more than 4 mm away from the distal end. In some embodiments, the amperometric glucose sensor is located no more than 3 mm away from the distal end. In some embodiments, the amperometric glucose sensor is located no more than 2 mm away from the distal end. In some embodiments, the amperometric glucose sensor is located no more than 1 millimeter (mm) away from the distal end.

In some embodiments, the device further comprises a housing comprising an upper accessible surface and a lower surface configured to be adhered to a skin surface. In some embodiments, the amperometric glucose sensor is disposed on a second hollow tube comprising a second distal end, wherein the second distal end is configured to be inserted subcutaneously. In some embodiments, the at least one indicating electrode comprises gold, carbon, graphite, platinum, or iridium. In some embodiments, the ligand is pyridine-based. In some embodiments, the ligand is 4,4'-dimethyl-2,2'-bipyridine. In some embodiments, the ligand is imidazole-based. In some embodiments, the redox mediator is bound to poly (4-vinyl pyridine). In some embodiments, the redox mediator is bound to poly (1-vinyl imidazole). In some embodiments, the excipient comprises the phenol. In some embodiments, the excipient comprises the cresol. In some embodiments, the amperometric sensor further comprises a reference electrode. In some embodiments, the reference electrode comprises a silver/silver chloride (Ag/AgCl) reference electrode. In some embodiments, the amperometric sensor further comprises an insulating layer and a metal layer, wherein the insulating layer is coupled to the metal layer, and wherein the metal layer is coupled to the electrode layer. In some embodiments, the insulating layer comprises a polyimide or liquid crystal polymer. In some embodiments, the metal layer has a thickness of at least about 1 micrometer (μm), 2 μm, 3 μm, 4 μm, 5 μm, 6 μm, 7 μm, 8 μm, 9 μm, or 10 μm. In some embodiments, the metal layer has a thickness of at least about 2 μm. In some embodiments, the metal layer comprises titanium, gold, or platinum. In some embodiments, the electrode layer comprises a film having a thickness of no more than about 1000 nanometers (nm), 900 nm, 800 nm, 700 nm, 600 nm, 500 nm, 400 nm, 300 nm, 200 nm, or 100 nm. In some embodiments, the electrode layer comprises a film having a thickness of less than about 500 nm. In some embodiments, the metal compound comprises a metal selected from the group consisting of: osmium, ruthenium, iridium, iron, cobalt, and any combination thereof.

In some embodiments, the redox mediator and the enzyme allow electron transfer from subcutaneous glucose to the at least one indicating electrode sufficient to cause a response of the amperometric glucose sensor to a subcutaneous glucose concentration at an applied bias potential of no more than about +250 millivolts (mV), +200 mV, +150 mV, +100 mV, or +50 mV relative to a reference electrode. In some embodiments, the applied bias potential of no more than about +250 mV, +200 mV, +150 mV, +100 mV, or +50 mV relative to the reference electrode allows the electrode layer to undergo substantially no electropolymerization of the excipient during continuous operation of at least one hour of the amperometric glucose sensor, thereby maintaining a sensitivity of the amperometric glucose sensor to the subcutaneous glucose concentration in presence of the insulin or insulin analog formulation.

In some embodiments, the metal compound comprises a metal selected from the group consisting of: Osmium, Ruthenium, Palladium, Platinum, Rhodium, Iridium, Cobalt, Iron, and Copper. In some embodiments, the metal compound comprises a metal selected from the group consisting of: Ruthenium, Palladium, Platinum, Rhodium, Iridium, Cobalt, Iron, and Copper.

In some embodiments, the ligand comprises a heterocyclic nitrogen compound, a pyridine ring combined with an imidazole ring, a non-nitrogen element substituted into a heterocycle ring, or an accessory "R" group bound to a heterocyclic ring. In some embodiments, the heterocyclic nitrogen compound comprises pyridine or imidazole with 1 ring, 2 rings, 3 rings, or 4 rings.

In another aspect, the present disclosure provides a method for delivering an insulin or insulin analog formulation and measuring a subcutaneous glucose concentration, comprising: (a) obtaining a device for delivery of an insulin or insulin analog formulation and measurement of subcutaneous glucose concentration, wherein the device comprises: (i) a hollow tube comprising a proximal end and a distal end, wherein the proximal end is in fluid communication with a source of the insulin or insulin analog formulation, wherein the distal end is configured to deliver the insulin or insulin analog formulation subcutaneously, wherein the insulin or insulin analog formulation comprises an excipient comprising a phenol or cresol; and (ii) an amperometric glucose sensor located no more than a pre-determined distance away from the distal end, wherein the amperometric glucose sensor comprises: an electrode layer comprising at least one indicating electrode, wherein the electrode layer underlies a redox-catalytic layer comprising (1) a redox mediator comprising a metal compound covalently bound to a ligand, and (2) an enzyme comprising glucose oxidase or glucose dehydrogenase; (b) connecting the proximal end of the hollow tube to the source of the insulin or insulin analog formulation; (c) performing subcutaneous insertion of the distal end of the hollow tube into a subject; and (d) simultaneously (1) delivering the insulin or insulin analog formulation subcutaneously to the subject and (2) measuring a subcutaneous glucose concentration of the subject.

In some embodiments, the amperometric glucose sensor is located no more than 15 mm away from the distal end. In some embodiments, the amperometric glucose sensor is located no more than 14 mm away from the distal end. In some embodiments, the amperometric glucose sensor is located no more than 13 mm away from the distal end. In some embodiments, the amperometric glucose sensor is located no more than 12 mm away from the distal end. In some embodiments, the amperometric glucose sensor is located no more than 11 mm away from the distal end. In some embodiments, the amperometric glucose sensor is located no more than 10 mm away from the distal end. In some embodiments, the amperometric glucose sensor is located no more than 9 mm away from the distal end. In some embodiments, the amperometric glucose sensor is located no more than 8 mm away from the distal end. In some embodiments, the amperometric glucose sensor is located no more than 7 mm away from the distal end. In some embodiments, the amperometric glucose sensor is located no more than 6 mm away from the distal end. In some embodiments, the amperometric glucose sensor is located no more than 5 mm away from the distal end. In some embodiments, the amperometric glucose sensor is located no more than 4 mm away from the distal end. In some embodiments, the amperometric glucose sensor is located no more than 3 mm away from the distal end. In some embodiments, the amperometric glucose sensor is located no more than 2 mm away from the distal end. In some embodiments, the amperometric glucose sensor is located no more than 1 millimeter (mm) away from the distal end.

In some embodiments, the device further comprises a housing comprising an upper accessible surface and a lower surface, and the method further comprises adhering the lower surface to a skin surface of the subject. In some embodiments, the amperometric glucose sensor is disposed on a second hollow tube comprising a second distal end, wherein the second distal end is configured to be inserted subcutaneously. In some embodiments, the at least one indicating electrode comprises gold, carbon, graphite, platinum, or iridium. In some embodiments, the ligand is pyridine-based. In some embodiments, the ligand is 4,4'-dimethyl-2,2'-bipyridine. In some embodiments, the ligand is imidazole-based. In some embodiments, the redox mediator is bound to poly (4-vinyl pyridine). In some embodiments, the redox mediator is bound to poly (1-vinyl imidazole). In some embodiments, the excipient comprises the phenol. In some embodiments, the excipient comprises the cresol. In some embodiments, the amperometric sensor further comprises a reference electrode. In some embodiments, the reference electrode comprises a silver/silver chloride (Ag/AgCl) reference electrode. In some embodiments, the amperometric sensor further comprises an insulating layer and a metal layer, wherein the insulating layer is coupled to the metal layer, and wherein the metal layer is coupled to the electrode layer. In some embodiments, the insulating layer comprises a polyimide or liquid crystal polymer. In some embodiments, the metal layer has a thickness of at least about 1 micrometer (µm), 2 µm, 3 µm, 4 µm, 5 µm, 6 µm, 7 µm, 8 µm, 9 µm, or 10 µm. In some embodiments, the metal layer has a thickness of at least about 2 µm. In some embodiments, the metal layer comprises titanium, gold, or platinum. In some embodiments, the electrode layer comprises a film having a thickness of no more than about 1000 nanometers (nm), 900 nm, 800 nm, 700 nm, 600 nm, 500 nm, 400 nm, 300 nm, 200 nm, or 100 nm. In some embodiments, the electrode layer comprises a film having a thickness of less than about 500 nm. In some embodiments, the metal compound comprises a metal selected from the group consisting of: osmium, ruthenium, iridium, iron, cobalt, and any combination thereof.

In some embodiments, the method further comprises applying a bias potential of no more than about +250 mV, +200 mV, +150 mV, +100 mV, or +50 mV relative to a reference electrode, wherein the redox mediator and the enzyme allow electron transfer from subcutaneous glucose to the at least one indicating electrode sufficient to cause a response of the amperometric glucose sensor to a subcutaneous glucose concentration at the applied bias potential. In some embodiments, the applied bias potential allows the electrode layer to undergo substantially no electropolymerization of the excipient during continuous operation of at least one hour of the amperometric glucose sensor, thereby maintaining a sensitivity of the amperometric glucose sensor to the subcutaneous glucose concentration in presence of the insulin or insulin analog formulation.

In some embodiments, the metal compound comprises a metal selected from the group consisting of: Osmium, Ruthenium, Palladium, Platinum, Rhodium, Iridium, Cobalt, Iron, and Copper. In some embodiments, the metal compound comprises a metal selected from the group consisting of: Ruthenium, Palladium, Platinum, Rhodium, Iridium, Cobalt, Iron, and Copper.

In some embodiments, the ligand comprises a heterocyclic nitrogen compound, a pyridine ring combined with an imidazole ring, a non-nitrogen element substituted into a heterocycle ring, or an accessory "R" group bound to a heterocyclic ring. In some embodiments, the heterocyclic nitrogen compound comprises pyridine or imidazole with 1 ring, 2 rings, 3 rings, or 4 rings.

In some embodiments, the subject has type 1 diabetes.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIG. 10 shows the steps in which microfabrication is used to create the patterns for the electrodes and the interconnect traces. After titanium foil is laminated to polyimide, a layer of silver is sputtered over the titanium, followed by placement of a layer of photoresist. Some of the photoresist is selectively removed 18 in order to make unwanted silver available for removal by an etchant. After the remainder of the photoresist is removed, the silver electrode pattern is revealed 19. After the next coat of photoresist is applied, platinum is then deposited by sputtering 20. As the photoresist is removed, the unwanted platinum is lifted off, revealing the platinum electrode pattern 21. The next layer of photoresist is applied and removed selectively 22. Where photoresist is absent, it is possible to etch away unwanted titanium. As the photoresist is removed 23, the correct titanium pattern is revealed 23.

DETAILED DESCRIPTION

Figure 1:
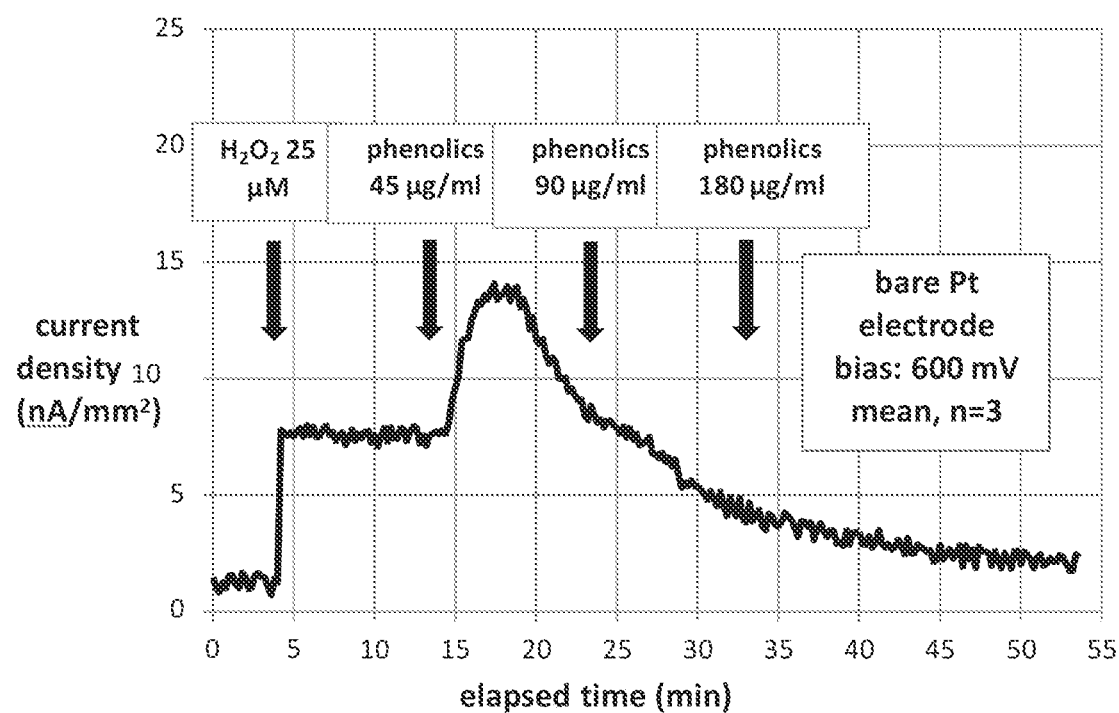
FIG. 1, a graph, shows the current obtained from a platinum electrode polarized at 600 mV. The initial response to hydrogen peroxide is normal and stable. The subsequent responses to ascending amounts of an insulin formulation containing phenolic preservatives initially display a positive (oxidative) response and later show a continuous decline of current, typical of electrode poisoning caused by electropolymerization.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

As used herein, the term "subject," generally refers to a person, individual, or patient. A subject can be a vertebrate, such as, for example, a mammal. Non-limiting examples of mammals include humans, simians, farm animals, sport animals, rodents, and pets. A subject may be a diabetes patient or suspected of having diabetes. The subject may be displaying a symptom(s) indicative of a health or physiological state or condition of the subject, such as diabetes. As an alternative, the subject can be asymptomatic with respect to such health or physiological state or condition.

A valuable technique in managing T1D is Continuous Glucose Monitoring (GCM), in which a subcutaneously-inserted sensor provides interstitial glucose data to the user every few minutes. For example, JDRF-sponsored trials may show that subjects of all ages who used CGM on a regular basis experience better glycemic control than non-users (e.g., as measured by hemoglobin A1C (A1C)). However, many subjects may find CGM usage cumbersome and many may use CGM only sporadically. Not surprisingly, when used sporadically or rarely, CGM usage may not lead to a better glycemic control.

Daily life may be difficult for those who regularly use both an insulin pump and CGM. Such individuals may be required to indwell two through-the-skin devices, which may increase the risk of pain, infection and other side effects compared to a single device. Persons with T1D may carry multiple devices on the body, for example, a pump and/or syringes, a CGM receiver, a vial of insulin, a blood glucose monitor for calibrating the CGM, and blood glucose monitoring strips and lancets. The multiplicity of devices may lead to a situation referred to as "device burden," which may lead to frustration, anger, and may cause a patient to choose among devices rather than utilizing all the devices that can improve his or her health.

Recognizing challenges encountered in clinical care and management because of issues regarding device burden, the present disclosure addresses an unmet need to integrate a CGM and insulin pump cannula into a single device.

Manufacturers' instructions may state that a subcutaneous glucose sensor must be located far away from the insulin pump cannula site. In support of this statement, during pig studies, we found that current insulin formulations markedly interfere with currently-available hydrogen peroxide-measuring sensors. More specifically, we found that the preservatives in the formulations, such as phenol and m-cresol, are electroactive and interfere with CGM.

The present disclosure provides devices and methods for use of same, in which a glucose sensor can be successfully integrated with the insulin cannula. Such glucose sensors and insulin cannulas may be described by, for example, U.S. Pat. No. 10,780,222, which disclosed osmium as a redox mediator element and pyridine-based and imidazole-based coordinating ligands bound to the osmium. Devices and methods of the present disclosure may use alternative metals, each of which can be used as a redox mediator, and alternative coordinating ligands.

It may be desirable to create a single combined device rather than using a separate insulin infusion catheter and a CGM sensor. There may be many different strategies for glucose sensing that may be considered for such a combined sensing catheter. For example, optical sensing technologies may be used for glucose. An optical glucose sensor may be built upon an optical waveguide. An optical sensing method may be based upon a glucose-binding fusion protein. An optical fiber-based sensor may have a hollow fiber filled with a glucose binding assay. A porous hollow sensor may contain porous beads for the optical determination of analyte concentration. Alternative sensing strategies such as viscometry may be used. However, all of these may encounter challenges when attempting to pair CGM with drug infusion (e.g., in a single device or in close proximity in a subcutaneous environment).

A common analyte sensor design may be based upon the principle of amperometry, in which analytes are detected by generation of an electrochemical signal related to the analyte of interest. The sensing electrodes may be fabricated through the use of sputtered or evaporated thin films deposited on the surface of a substrate. In some embodiments, indicating electrodes (also referred to as working electrodes) are made of platinum, gold or carbon. When a positively biased indicating electrode is coupled with a reference electrode, such as silver/silver chloride, redox-active analytes may be amperometrically detected. With the addition of an enzyme layer such as glucose oxidase, a sensor may be made specific for the analyte glucose. The glucose oxidase may be able to convert glucose, which may not be readily detected amperometrically, into hydrogen peroxide, which may be readily detected (e.g., using a sensor). When thin films of metal electrodes are deposited on an appropriate polymer film such as polyimide, the resulting sensor may have added advantages of flexibility. For example, users may find a rigid catheter or needle uncomfortable or painful.

A problem with electrodes made from metallic thin films may be fragility; the layers may delaminate when exposed to physical trauma such as impact, flexion, shear stresses, and tensile stresses. For example, durability of thin film electrodes may be limited.

More specifically, a large number of flexion cycles may lead to materials failure, a phenomenon referred to as cycle fatigue. While the durability of a thin film may be sufficient for short-term applications, longer term ambulatory sensing applications may require a much greater ability to withstand trauma. In the case of indwelling subcutaneous sensors, the sensor may be required to withstand repeated impacts and/or repeated flexion over a period of time lasting from 3 to 7 days or beyond. Thin metal films may undergo cracking, which may be aggravated by immersion in wet, high-salt environments such as those presented by mammalian blood or subcutaneous interstitial fluid. Consequently, the electrodes in commercially-available CGM sensors (e.g., made by Dexcom, Inc.) may be constructed from durable solid wires rather than thin films. Examples may include a wire-based variable stiffness transcutaneous medical device, a wire-based transcutaneous implantable continuous analyte sensor with a silicone-based membrane, a biointerface for a wire-based sensing electrode, a transcutaneous analyte sensor assembly, a flexible, solid wire-based glucose sensor, a multi-electrode wire-based sensor, and a multi-layer sensor having a solid core. However, a wire or rod has a solid core, and thus may not be compatible with delivery of a drug such as insulin, which may require a hollow lumen. These devices may face challenges for application to a combined analyte sensing and drug delivery due to their lack of a hollow lumen.

Other devices may use sensors coupled with hollow catheters (e.g., a glucose sensor disposed within a hollow catheter). More specifically, the sensor may be disposed inside a larger diameter catheter that is indwelled inside a blood vessel. Whereas such a device may be appropriate for measuring a liquid (blood) that exists within a catheter, such a design may not be appropriate for a sensing catheter for measuring glucose in subcutaneous fatty tissue. For use in subcutaneous tissue, the sensing elements may need to be on the outer wall of the hollow catheter. Generally, a "wire sensor within a tube" or "tube within a tube" design may not allow proper function in subcutaneous tissue. For drug delivery, the inner lumen may need to be hollow. For example, consider a device having sensing elements located in the interior of the hollow part and designed to measure analytes in the interior lumen. For an effective subcutaneous sensing catheter, it may be necessary to have an open interior (lumen) to allow for drug delivery into the body. In an embodiment of a device of the present disclosure, the outer wall, which is not in contact with a drug and which is bathed with glucose-containing subcutaneous interstitial fluid, which is a suitable location for the sensing elements.

Other sensor configurations may require the withdrawal of fluid samples from the body in order for sensing to occur. For example, a hollow fiber-based glucose sensor may involve dialysis with a test solution. As another example, a hollow probe may be used for the withdrawal of interstitial fluid. As another example, a hollow electrochemical cell with internal sensing elements may require the drawing up of the fluid sample. As another example, a glucose dehydrogenase-based sensor may incorporate an interstitial fluid sampling device. As another example, a method for determining glucose concentration may require the use of a device that has an external sensor coupled with a fluid-sampling pump. As another example, a sensor may incorporate a hollow member and a lancet for the sampling of interstitial fluid. As another example, a system may incorporate a microdialysis-based sensor. As another example, a sampling device incorporate a vacuum for the drawing up of a blood sample from the skin surface. These devices may face challenges for application that permit ongoing delivery of a drug with simultaneous exposure of the sensor to interstitial fluid. Consequently, these systems may not be compatible with continuous subcutaneous drug infusion.

Other sensor configurations may utilize microneedles to reduce the invasiveness of the measurement technique. However, microneedle arrays may face challenges of keeping all the microneedles indwelled in mammalian tissue during body movement. Because microneedles are short in length, many of the needles may have a tendency to come out of tissue when the person moves suddenly or forcefully. This problem of unintentional explantation may render them unsuitable for extended use in an outpatient setting.

For example, a unified hollow structure may be used for analyte sensing and for drug delivery. Though insulin may be used, such a device may not be able to avoid the oxidative interference from preservatives and avoid the fragility of thin metal electrodes laminated to hollow structures. Similarly, devices may not enable measurement of glucose in the presence of insulin preservatives and/or may not avoid the problem of fragility of thin metal electrodes.

In order to fabricate a combined sensor/catheter, one can incorporate biosensing elements into the wall of a hollow needle or catheter. For example, fabrication may comprise directly depositing metal (e.g. platinum, gold) indicating thin film indicating electrodes and thin film silver (Ag/AgCl) reference electrodes on the underlying polymer layer such as polyimide or polyester. One such design, may incorporate printed electrode films. However, in vivo studies in animals, have demonstrated a significant problem with sensing catheters made of thin film metal electrodes deposited over a polymeric layer. In particular, these sensors exhibited frequent delamination and general lack of durability.

At many bias potentials, insulin preservatives (phenol and m-cresol) in the vicinity of a glucose sensing indicating electrode create a large current (flow of electrons), which may not be readily distinguishable from a high glucose level. More specifically, when an indicating electrode in the presence of the preservatives is polarized at a high bias potential, there may be a large current even in the absence of glucose. For this reason, a method of reducing or eliminating the glucose-like current is to use a much lower bias potential. If a hydrogen peroxide sensing system is utilized, it may be difficult to achieve a sufficient glucose current from peroxide oxidation while, at the same time, minimizing the interference that results from the insulin preservatives.

In contrast, if one utilizes certain systems such as redox mediators (e.g., based on a metal such as osmium, ruthenium, iridium, iron, and cobalt) that operate at a low bias potential, electrons may be transferred from glucose to an indicating electrode without interference from the insulin preservatives. Examples of metal choices that can be used as a mediator are disclosed herein. The mediator may be bound to a coordinating ligand, and several choices for the coordinating ligands are disclosed herein. The mediator-ligand complexes may be attached to a polymer, such as polyvinylpyridine or polyvinylimidazole, which can be further crosslinked by bifunctional crosslinkers and immobilized at the sensor surface.

Alternatively to, or in conjunction with, using redox mediator chemistry, a specialized filter may be used to trap the phenol and m-cresol before being delivered to the subject, thus preventing these compounds from reaching the subcutaneous space and causing an interference current. Because these filters prevent the phenol and m-cresol from reaching the subcutaneous space and from reaching the amperometric sensor, such filters may be used in combinations with sensors that employ conventional hydrogen peroxide detection, such as platinum-based sensors without redox mediators.

Regardless of whether a redox mediator or filter is utilized, the device may not function properly if the layers of the sensing catheter are not durable. For example, if thin metal films that make up the indicating electrode are deposited directly on to the polymer substrate, the electrode films may not be robust and durable. Instead, they may disintegrate and/or delaminate from the polymer during the usage period.

To avoid this fragility, and at the same time, minimize cost, it may be necessary to laminate the thin metal electrode films to an underlying metal such as titanium. To be sufficiently robust, this metal may need to be substantially thicker than the electrode film.

To reduce device burden, it may be desirable to be able to measure glucose continuously at the direct site of insulin delivery, especially in subcutaneous interstitial fluid. In an attempt to better understand the response of an electrode or sensor in the presence of an insulin formulation, the experiment shown in FIG. 1 was carried out. This figure shows the responses of a platinum electrode (polarized at 600 mV vs a Ag/AgCl reference electrode) studied in phosphate-buffered saline (PBS). (For the purposes of definition, the term reference electrode in this disclosure refers to a reference electrode in a three electrode system or to a combined reference plus counter or reference plus auxiliary electrode in a two electrode system). The electrodes were bare, i.e. not coated with enzyme or an outer membrane. Early in the experiment, hydrogen peroxide (H2O2) was added, and the electrodes responded briskly and maintained current in a stable fashion. At minute 13, a standard commercially-available insulin formulation (aspart insulin, Novo Nordisk) was added such that the concentration of phenol and m-cresol together (phenolics) was equal to 45 µg/mL. It can be clearly seen that there was a brisk oxidative (rising) current immediately after the insulin formulation was given. However, the rise in current was transient and after a few minutes, it began to decline despite continued presence of the phenolics. At minute 23 and minute 33, more aspart insulin was given such that the concentration of phenolics became much higher, as indicated. It is important to note that no rise in current was seen after these later additions; instead, the current continues to decline such that the final current was markedly lower than the original current obtained from the H2O2 (which also remained in the solution). This progressive loss of current is due to poisoning of the electrode. More specifically, the phenol and cresol undergo a process of electropolymerization in which a thin layer of insulating polymer is formed on the electrode surface. This layer is largely impermeable to multiple analytes including H2O2, and for this reason, after exposure to phenolics, such an electrode is useless for the purpose of measuring glucose or other analytes.

Another experiment (not shown) was carried out with insulin that does not contain preservatives (this preparation was branded Gibco and was purchased from Thermo Fisher Life Technologies). This insulin did not cause any electrochemical response and did not cause electrode poisoning. This experiment demonstrates that the interference noted in FIG. 1 is due to the preservatives, not the insulin per se.

Figure 2:
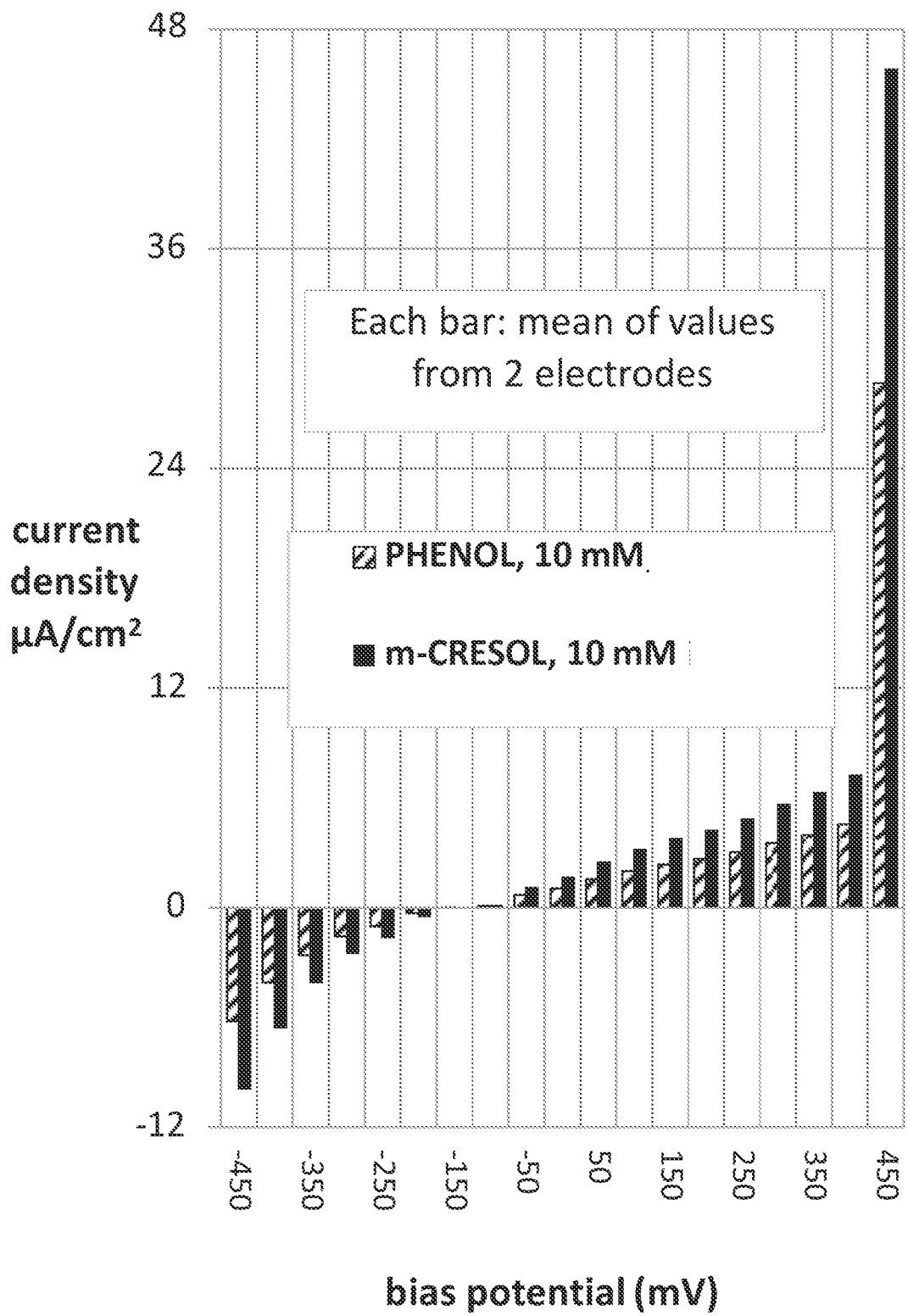
FIG. 2, a bar graph, shows the electrochemical effects of phenol and m-cresol on bare electrodes polarized at many different bias potentials. In particular, at high positive potentials typical of those used for peroxide detection, a very high oxidative current is observed. For both phenol and cresol, the oxidative current declines markedly as the bias potential is lowered. The appearance of such data obtained with platinum and gold electrodes is very similar. The data shown here are on gold electrodes.

We then decided to investigate the effect of the magnitude of the bias potential on the electrochemical response to the phenol and cresol, as shown in FIG. 2. In this experiment, bare gold electrodes were polarized at different potentials and exposed sequentially to phenol (10 mM) and to m-cresol (10 mM). Electrodes were exposed to the phenolics for a very short period of time and were cleaned between tests to remove any electropolymerized polymer. The results showed that the responses to the phenolics are very dependent upon the magnitude of the bias potential. In particular, as the potential is raised to high potentials such as those over 350 mV, there is a very large oxidative response. In contrast, as the bias is lowered, particularly below 250 mV, the response is quite low.

In an attempt to minimize the interference by reducing the bias potential, we carried out experiments using a redox-mediated chemistry scheme. Another metal (such as ruthenium, iridium, iron, or cobalt) may be substituted in place of osmium to produce similar results.

Redox mediator complexes (e.g., based on a metal such as osmium, ruthenium, iridium, iron, and cobalt) may be suitable compounds for accepting electrons from glucose oxidase, more specifically from the prosthetic group of glucose oxidase known as flavin adenine dinucleotide (FAD). The metal utilized as a redox mediator can be any member of the following Redox Mediator Metal Group: Ruthenium, Palladium, Platinum, Rhodium, Iridium, Cobalt, Iron, and Copper. Member of the Redox Mediator Metal Group can be abbreviated MRMMG.

Osmium may serve as a redox mediator; however, an advantage of the Redox Mediator Metal Group is that its members have a substantially lower cost than osmium. In an embodiment, a member of the Redox Mediator Metal Group is coordinated to a ligand such as, 4,4'-dimethyl 2,2'-bipyridine and also bound to the PVI polymer. Many other ligands can be used, some of which are disclosed herein. The bond to the PVI may prevent the redox mediator ligand from dissociating from the polymer backbone.

It should be understood that 4,4'-dimethyl 2,2'-bipyridine is only one example of a suitable coordinating ligand. Members of the Coordinating Ligand Class include, but are not limited to, the following:

(1) heterocyclic nitrogen compounds, for example, pyridine or imidazole, with 1 ring, 2 rings, 3 rings, or 4 rings;
(2) ligands in which one or more pyridine rings combine with one or more imidazole rings;
(3) ligands in which one or more non-nitrogen elements are substituted into the heterocycle rings; and
(4) ligands in which other chemical groups are bound to heterocyclic ring atoms. These groups are often termed "R" groups, or accessory groups.

Electron donating groups such as methyl, methoxy or amino, when bound to a member of the Redox Mediator Metal Group, may allow the member of the Redox Mediator Metal Group to transfer electrons at a lower polarizing bias. A member of the Redox Mediator Metal Group together with a member of the Coordinating Ligand Class may be referred to as a redox mediator. For improved function, the redox mediator may be bound to a polymer, and this complex may be referred to as a redox mediator polymer (RMP). The RMP may be crosslinked with agents such as glutaraldehyde or polyethyleneglycol diglycidyl ether, both of which link amine groups.

In some embodiments, the RMP is deposited on a gold indicating electrode, but other materials may be used, such as vitreous carbon, glassy carbon, graphite, platinum, or iridium. It is also possible to make the indicating electrode porous, for example by the use of acid anodization, laser poration, or plasma etching.

In some embodiments, the RMP is coated with a polymeric layer called the outer membrane. Oxygen permeability is not necessary for the function of this type of sensor, but a degree of glucose permeability is necessary. The outer membrane may be made of polyurethane, Nafion, poly(vinylpyridine), poly(vinylpyridine)-co-styrene, molecular weight cutoff polymeric membranes, silicone, hydrogels and many other materials that allow glucose permeation.

Figure 3:
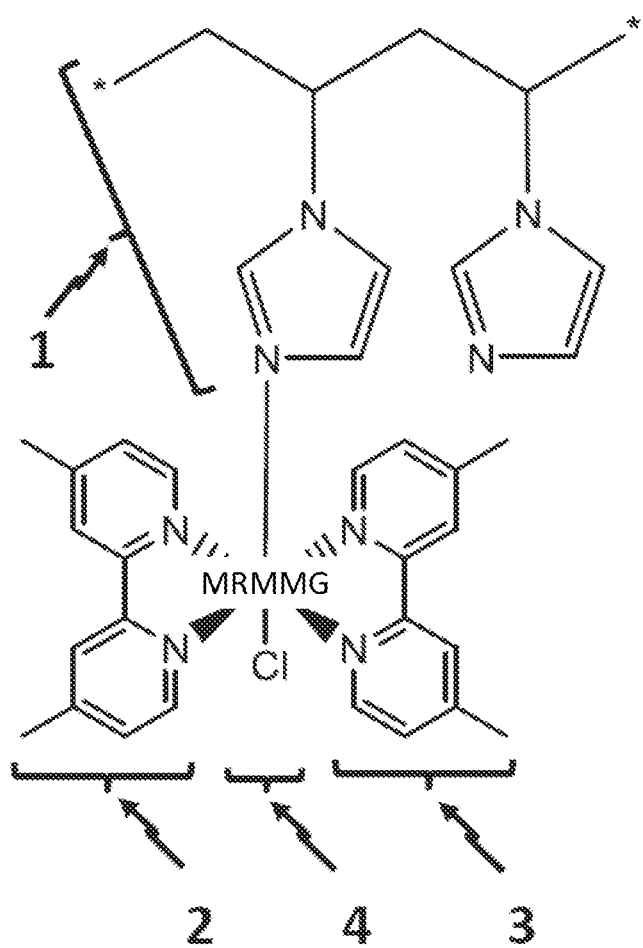
FIG. 3 shows the structural formula of the polymer repeat unit (poly(1-vinyl imidazole)) 1 bound to a member of the Redox Mediator Metal Group (defined below) 4 with two 4,4'-dimethyl, 2,2'-bipyridine moieties 2 and 3 (abbreviated PVI-MRMMG-DiMeBPY).

For the exemplary experiments shown here, we utilized the member of the Redox Mediator Metal Group compound shown in FIG. 3. The polymer backbone 1 is composed of poly(1-vinyl imidazole) (PVI). Two coordination ligands, 4,4'-dimethyl,2,2'-bipyridine 2 and 3 are bound to a member of the Redox Mediator Metal Group 4. The member of the Redox Mediator Metal Group 4 is bound to approximately one of every 5 to 15 imidazole groups on the PVI.

Figure 4:
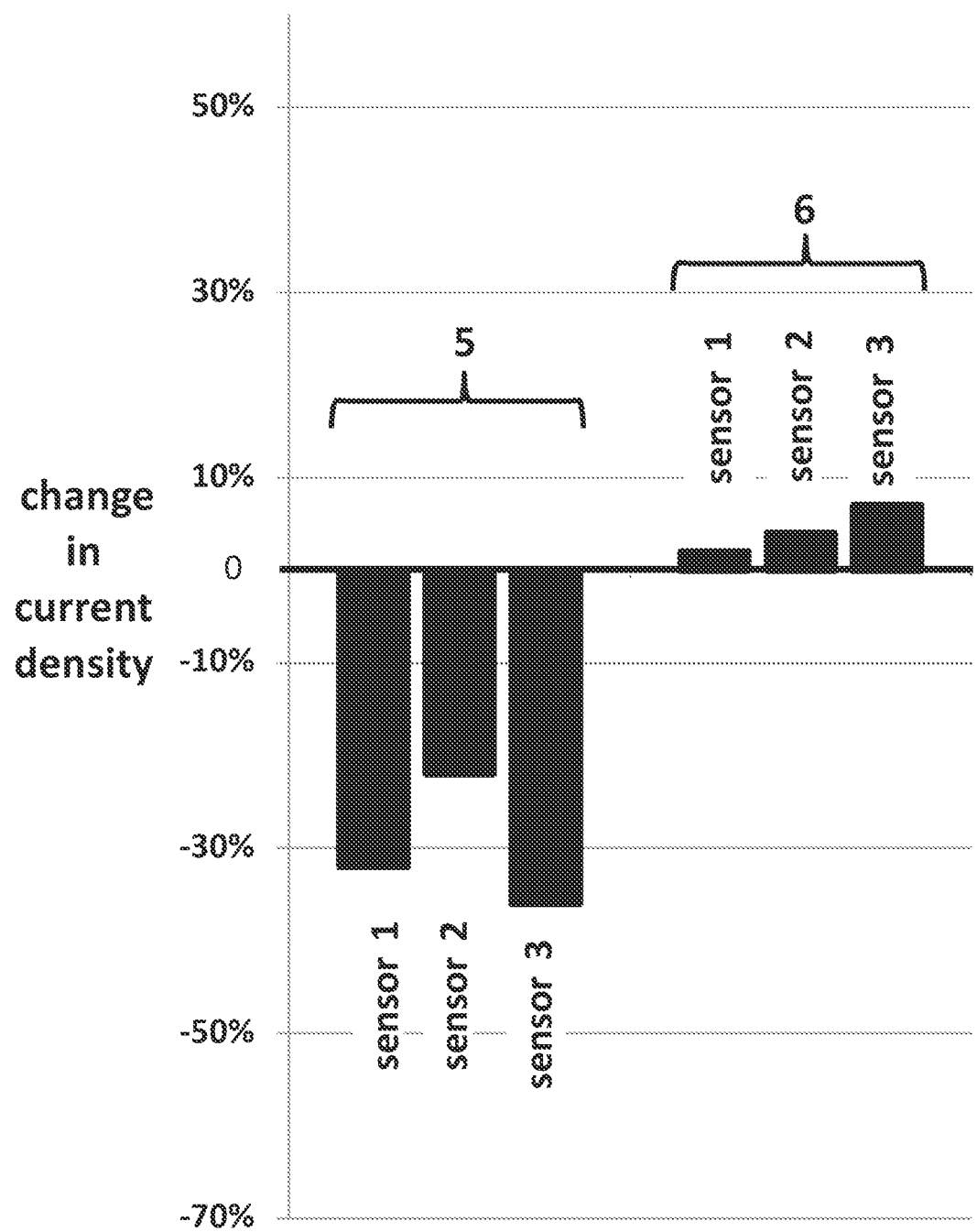
FIG. 4, a graph, compares the incremental change in current density of two types of glucose oxidase-based sensors after exposure to high dose mixed phenolics (total concentration 180 µg/mL, composed of equal parts by weight of phenol and m-cresol) over 20 minutes in the presence of glucose 5 mM. Over this period, there was a marked decline in current density 5 in each of the three platinum sensors. The bias potential of these sensors was 600 mV. In contrast, there was very little change in each of the three gold sensors 6 that were coated with glucose oxidase and a redox mediator bound to a ligand and to a polymer, and biased at 180 mV.

Using RMP-based sensors and conventional platinum H2O2-sensing sensors, we then carried out the in vitro experiment shown in FIG. 4. In this experiment, gold sensors with coats of RMP, glucose oxidase, and an outer membrane were compared to platinum sensors coated with glucose oxidase and an outer membrane. The RMP-based sensors were biased at 180 mV and the platinum sensors were biased at 600 mV. After first being exposed to a 5 mM glucose solution, the platinum-based sensors 5 and the RMP-based sensors 6 were then exposed to ascending amounts of commercial aspart insulin formulation (Novo Nordisk) containing phenolics, as described for the earlier experiments shown in FIG. 1. FIG. 4 shows only the incremental response obtained at the highest concentration of phenolics, 180 µg/ml. Each bar represents results from a single sensor. It should be noted that there was a large negative response in the conventional platinum-based sensors 5 and only a small positive response in the RMP-based gold sensors. As discussed earlier, this large negative response lowered the response of the sensors to a point far below the original response to glucose (which remained in the solution), thus demonstrating a degree of electrode poisoning. As a follow up (not shown) to this experiment, both the platinum-based and RMP-based gold sensors were removed from the solution, rinsed and re-exposed to glucose 5 mM. The platinum-based sensors had a very low, nearly absent response to glucose (verifying permanent poisoning), but the response of the RMP-based sensors was brisk and nearly identical to the original response to glucose. Another metal (such as ruthenium, iridium, iron, or cobalt) may be substituted in place of osmium to produce similar results.

Figure 5:
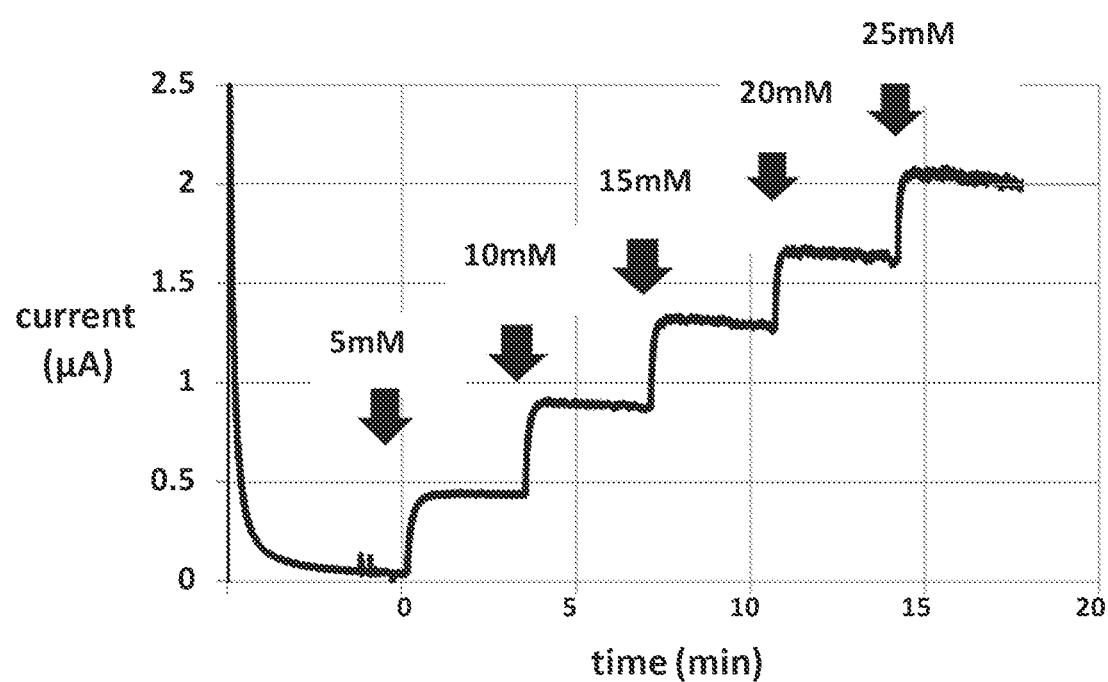
FIG. 5, a graph, shows a series of amperometric responses of a gold sensor coated with glucose oxidase and a redox mediator bound to a ligand and to a polymer, to successive increases in glucose concentration in a solution of phosphate buffer sparged with Argon. The responses to glucose over this concentration range are largely linear.

FIG. 5 shows a response of a RMP-based sensor with a gold indicating electrode and a Ag/AgCl reference electrode to stairstep increases in glucose concentration in phosphate buffer during continuous Argon sparging. In this case, the RMP and glucose oxidase were crosslinked with polyethyleneglycol glycidyl ether but similar results were also obtained using glutaraldehyde liquid or glutaraldehyde vapor. Note that the response to glucose, up to at least 25 mM, is essentially linear.

The foregoing series of experiments demonstrate that a gold sensor, coated with RMP and crosslinked glucose oxidase and polarized at 180 mV vs Ag/AgCl, is able to measure glucose with little or no interference from the preservatives used in insulin formulations. In contrast, the use of a platinum sensor, coated with crosslinked glucose oxidase and polarized at 600 mV, undergoes an initial very large oxidation current when exposed to phenolics. Furthermore, if such exposure lasts for more than a few minutes, the electrode is consistently poisoned by a dense layer of electropolymerized phenolic compound that prevents H2O2 and other common analytes from reaching the indicating electrode and being measured. Another metal (such as ruthenium, iridium, iron, or cobalt) may be substituted in place of osmium to produce similar results.

Subcutaneous devices are exposed to many types of trauma, for example due to bodily motions and impacts typical of daily life. Therefore, even though the chemical layers over an electrode can successfully measure glucose without interference from phenol and cresol, a dual use sensing catheter may not function accurately for its entire usage period unless said catheter has a durable, robust construction.

One method of creating a continuous sensor built into the wall of an insulin infusion cannula is to laminate flexible thin metal films on the outer wall of a hollow tubular structure. However, if the choice of materials and processes are not carried out correctly, the resulting electrode layers may be very fragile. More specifically, if thin film metal electrode materials (less than 100 nm in thickness) are placed directly over polymeric surfaces (with or without underlying thin adhesion layers such at Ti, Au or Ni) the device becomes fragile. The electrode films often delaminate or disintegrate during impact, and therefore, such a device is not adequate for use as a catheter indwelled for days in the subcutaneous space. In fact, in such a design, substantial electrode delamination can be seen after only a few hours of in vivo use. In the experience of the inventors, whether or not a 25-200 nm tie (adhesion) layer is deposited under the electrodes, such a design leads to a frequent separation of the tie layer from the polyimide, frequent separation of the indicating or reference electrode films from the tie layer, and frequent fragmentation of the metal layers.

On the other hand, if a metallic foil is placed beneath the thin film metal electrodes, durability and fatigue resistance are markedly improved, while maintaining sufficient flexibility for fabrication and use as a biosensor. The use of the term "foil" indicates a metal layer that is at least 2 micrometers ($\mu$m) in thickness, that is, much thicker than the thin film layer typically deposited by sputtering, evaporation, printing or electroplating. Foils may have beneficial mechanical properties. For these reasons, a metal foil (underneath the thin electrode film) is well-suited for the purpose of durability.

All layers of the sensing catheter must be tightly adhered to the adjoining layers. One method of creating interfaces with good adhesion and good durability is the use a laminating press at high temperature and high pressure. A high tack adhesive such as B-stage acrylate is located at the interface of the foil and underlying polymer and adheres the two materials together. After the lamination, thin film electrode materials can be deposited over the durable metal foil. The thickness of the metal foil is typically 2-15 $\mu$m.

The metal of which the foil is composed must be chosen carefully. In the case of an amperometric glucose sensor, the indicating electrode is typically platinum, gold or carbon. Copper (which is commonly used as the foil for flexible electronic circuits), is not suitable for use in a biosensor. Specifically, if there is concurrent physical contact between interstitial fluid, copper and platinum, a large galvanic current may occur as a result of the junction of dissimilar metals. A suitable candidate for the foil is titanium, which is inexpensive and which we found to cause little to no galvanic current when paired with platinum. Silver and copper are not suitable as this foil material. Gold is of intermediate value.

Using the durable sensing catheter design discussed above, we carried out a series of studies in non-diabetic Yucatan mini-pigs of weight 33-60 kg. In preparation for this study, sensing catheters were fabricated. A polyimide strip, 12.5 $\mu$m in thickness, was laminated with a sheet of titanium foil, 5 $\mu$m in thickness. Three thin film 1 square mm platinum indicating electrodes and a Ag/AgCl reference electrode were sputtered on to the titanium foil surface. This electrode strip was wrapped around, and laminated to, the outer surface of a blunt, hollow 21 gauge stainless steel tube with the aid of an epoxy adhesive designed for use in high salt moist environments. The indicating electrodes were coated with glucose oxidase and bovine serum albumin (BSA) (in a ratio of 3:2) and crosslinked with glutaraldehyde vapor, then coated with a silicone-polyurethane copolymer outer membrane (Lubrizol, Inc). The term used for such a dual use device is a "glucose sensing catheter" or "sensing catheter." A series of interconnect traces emanate from the three indicating electrodes and the single reference electrode and terminate in a body-worn electronic sensor module which is in electrical continuity with the sensing catheter. The sensor module contains a battery and a Bluetooth-enabled transceiver, which transmits the electrochemical signals to a personal computer or mobile phone.

Multiple sensing catheters, attached to telemetric sensor modules, were inserted in the subcutaneous tissue of the pig's abdomen under isoflurane anesthesia. The sensor module was adhered to the skin with cyanoacrylate glue, then each pig was allowed to recover from anesthesia. The next morning, the animal was again anesthetized with isoflurane. After a stabilization period, a euglycemic clamp was carried out for 5 hours. More specifically, an infusion of 20% dextrose was given intravenously according to a computerized algorithm in order to avoid hypoglycemia. At minute 105 during the clamp, as indicated by the arrow in FIG. 6, lis-pro insulin (0.22 units per kg total dose, divided between two catheters, so that 0.11 units per kg was delivered through each catheter) was given through some sensing catheters. Insulin was not delivered through other sensing catheters.

Figure 6:
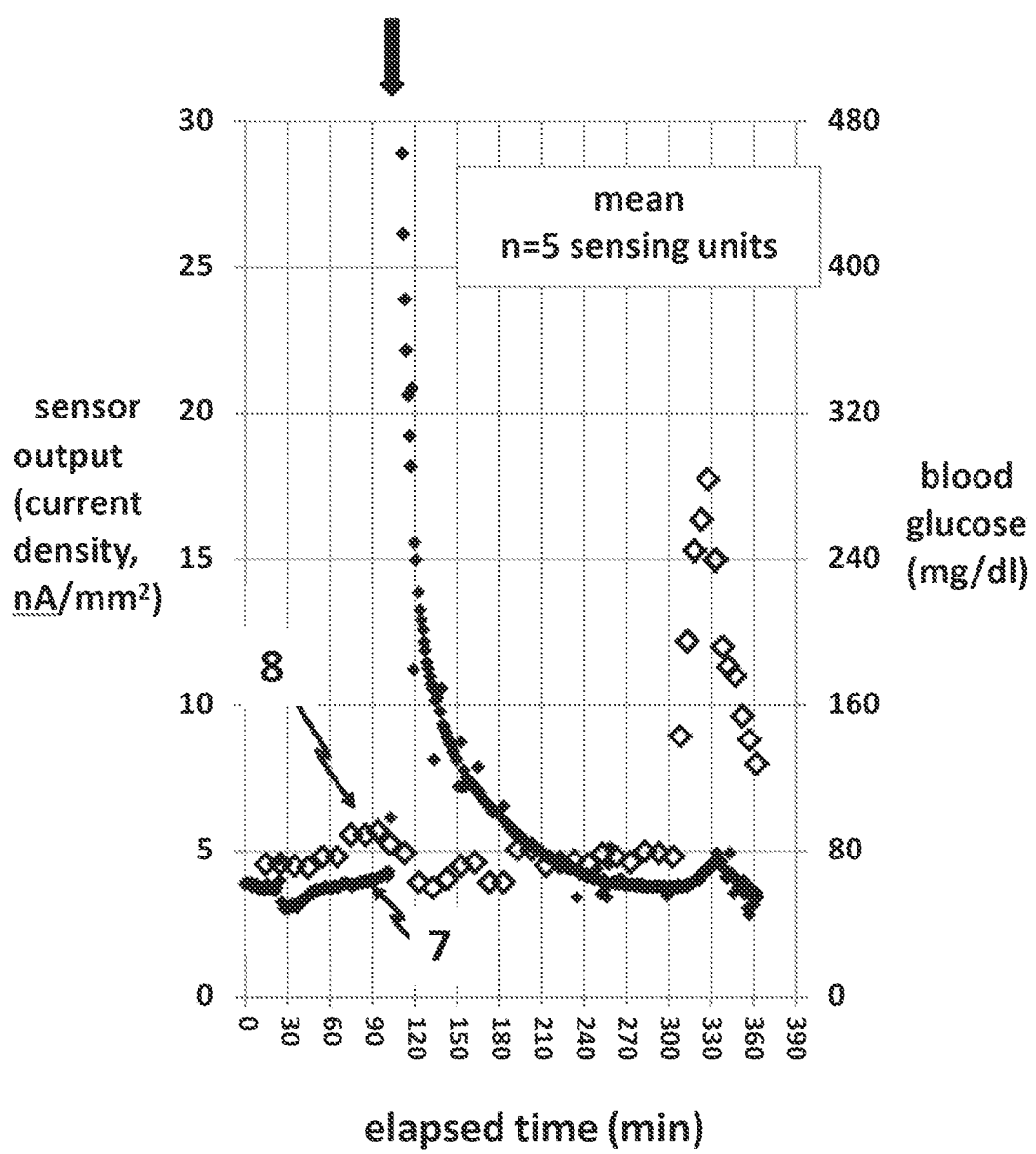
FIG. 6, a graph, shows the amperometric signal 7 (small closed symbols) and glucose levels 8 (large open symbols) obtained in pigs from a glucose oxidase-based hydrogen platinum sensor biased at 600 mV. When lis-pro insulin was given at minute 105 (indicated by arrow), the preservatives in this formulation led to an immediate very high oxidative response followed by electrode poisoning caused by electropolymerization. The poisoning is evident toward the end of the experiment when the amperometric signal is minimal despite very high glucose levels.

FIG. 6 shows mean exemplary data obtained from several sensing catheters through which the lis-pro insulin was delivered. The electrochemical sensor current 7 and the blood glucose values 8 (measured in duplicate by a Bayer Contour Next meter) are shown by arrows. Note that immediately after the insulin was given, there was a very large current spike with a fast exponential decline. Late in the experiment, at minute 300, a rapid infusion of 20% dextrose was given intravenously, leading to a marked rise in blood glucose to a level of almost 300 mg/dl. It can be seen that the sensors were unable to respond vigorously to this marked rise in glucose level. There was only a very small rise in current during hyperglycemia, typical of sensors that had undergone electrode poisoning. Many such experiments were carried out in pigs. In summary, in about 40% of the experiments in which lis-pro insulin was given, there was a marked oxidative rise in current between minutes 105 to 165, despite the fact that glucose was being held steady. It is likely that in these cases, the insulin formulation, after leaving the catheter, flows back on to the sensor elements, causing an oxidative signal. In the other cases, it is likely that the insulin formulation flows away from the catheter without contacting the sensing elements, thus failing to cause an interfering signal. Another metal (such as ruthenium, iridium, iron, or cobalt) may be substituted in place of osmium to produce similar results.

Figure 7:
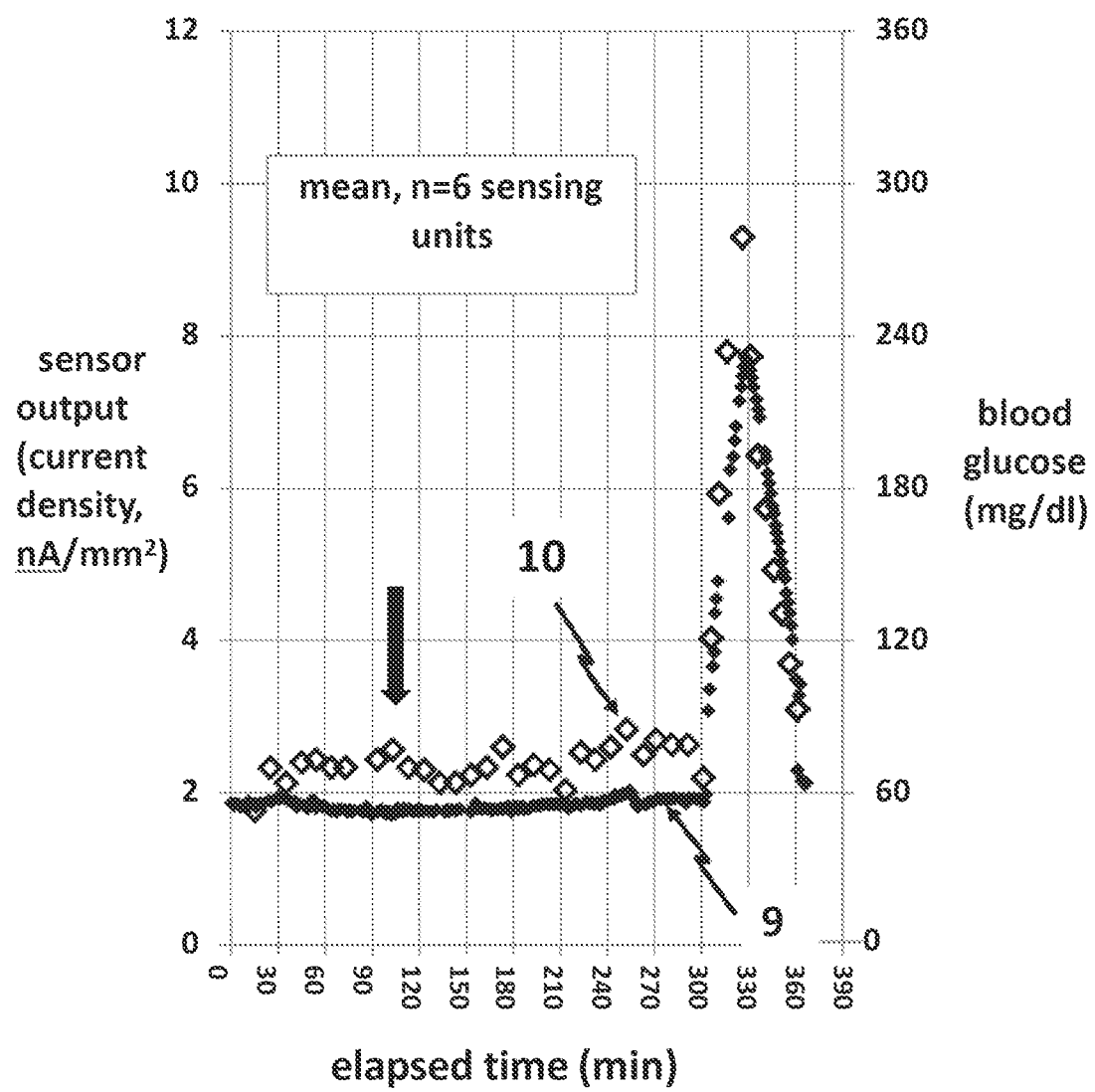
FIG. 7, a graph, shows the amperometric signal 9 and glucose levels 10 obtained in pigs from a gold-based sensor coated with glucose oxidase and a redox mediator bound to a ligand and to a polymer, crosslinked with glutaraldehyde, biased at 180 mV. Lis-pro insulin was given at minute 105 (indicated by arrow), and despite a high level of preservatives in this formulation, there was no change in the amperometric signal 9. Notable is the brisk rise of the current 9 over the final hour of the experiment in response to marked hyperglycemia, verifying absence of electrode poisoning.

Other pig experiments were carried out with sensing catheters with gold indicating electrodes and RMP bound to glucose oxidase by glutaraldehyde. FIG. 7 shows mean data from several RMP-based gold sensors through which lis-pro insulin was delivered. Consistent with the in vitro data discussed above, there was little to no evidence of interference from the insulin preservatives after the insulin formulation was given. Sensor current 9 did not rise at minute 105 when lis-pro insulin was given. Furthermore, the RMP-based sensors responded vigorously to the marked hyperglycemia during the last hour of the study. Note that blood glucose rose briskly during the last hour of the study. During this rise, the brisk rise in current 9 verified absence of electrode poisoning. Another metal (such as ruthenium, iridium, iron, or cobalt) may be substituted in place of osmium to produce similar results.

Figure 8:
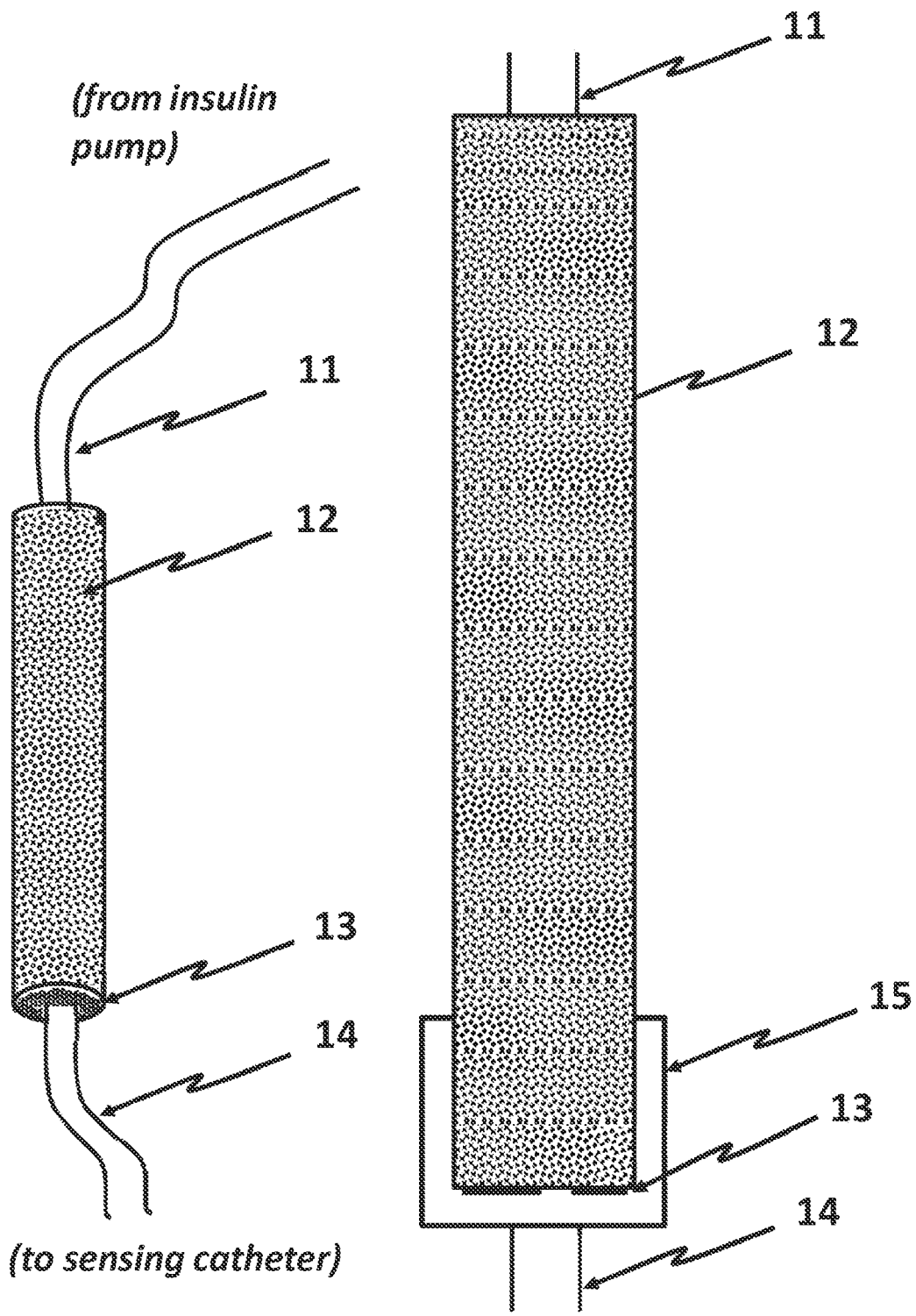
FIG. 8 is a drawing of an in-line filter that removes phenolics from an insulin infusion line. The proximal feed insulin line 11 brings insulin formulation from an insulin pump and is connected to the proximal end of the filter 12. A protective membrane 13 prevents the filter material from entering the insulin exit line 14 located at the distal end of the filter. A zoomed-in view on the right panel also shows a cylindrical retainer 15 which holds the protective membrane 13 and the exit line 14 firmly on to the distal end of the filter 12 without blocking the passage of insulin.

We also discovered another approach of avoiding the preservative-induced oxidative current: the use of filter that is placed in the insulin infusion line. For example, hydrophobic Zeolite filtration may be used to remove insulin preservatives from an insulin formulation vial prior to injection. In an embodiment, we teach the use of in-line filters designed to be used by persons with diabetes who use portable insulin pumps that deliver insulin subcutaneously. Such a filter is depicted in FIG. 8. The plastic tubing that comes from the insulin pump 11 is attached to the filter cartridge 12 that is filled with filter material. At the distal portion of the filter cartridge is a protective membrane 13 that prevents filter beads or particles from being released into the insulin tubing (and thus into the body of a patient). One such embodiment for this protective membrane is porous cellulose acetate, the pore size being smaller than the filter bead material. Many other membrane compositions and many pore sizes are suitable in the fabrication of the protective membrane. Tubing 14 brings the filtered insulin out of the filter cartridge into the sensing catheter. On the right panel of FIG. 8 is shown a zoomed-in figure of the filter with additional detail. Typically, it is necessary to utilize a retainer unit 15 that holds the filter cartridge 12, the protective membrane 13 and the exit tubing 14 firmly in place. In some embodiments it is also desirable to place a retainer unit at the proximal end of the filter.

There are many such bead or particle materials that can be used to filter the phenolics out of the insulin formulation. Some of these materials include those typically used for size exclusion chromatography, also known as gel filtration chromatography and molecular sieve chromatography. As used herein, size exclusion media may be particles containing pores that trap smaller molecules and allow larger molecules to readily pass through. In the case of one embodiment, preservatives contained in insulin formulations, including m-cresol and phenol, are trapped within small pores. The larger insulin molecules, which are not trapped, pass readily through the filter.

One suitable filter material is crosslinked dextran, one brand of which is Sephadex®. Sephadex G10 is suitable since it is intended to separate compounds smaller than 700 Daltons from those larger than 700 Daltons. This grade of crosslinked dextran is suitable because cresol and phenol weigh about 100 Daltons, whereas insulin and insulin analogs weigh about 5800 Daltons. Other grades of crosslinked dextran can also be used. In addition to dextran, other choices for filter materials include carbon (including charcoal and activated carbon), alumina, silicates, silica, mixtures of alumina and silica knows as Zeolites, and other compounds used to separate compounds based on molecular size. It is also possible to use materials typically used in reversed phase high performance liquid chromatography to separate molecules on the basis of hydrophobicity/hydrophilicity. Phenol and cresol are more hydrophobic than insulin.

Figure 9:
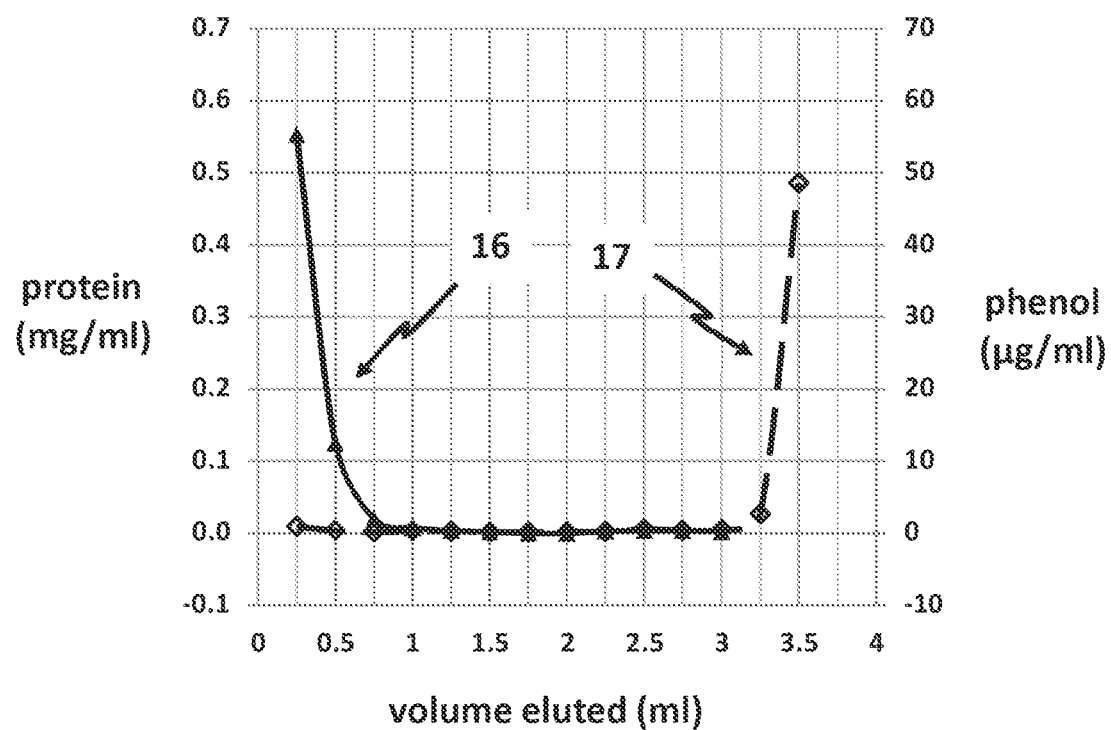
FIG. 9, a graph, demonstrates the effectiveness of the filter that removes phenolics. Aspart insulin was placed on the proximal end of the filter. Many samples (each 0.25 mL in volume) were then collected during delivery of phosphate buffer (in 0.25 mL units). Results of an assay for insulin 16 (as estimated by measurement of total protein using a bicinchoninic acid [BCA] assay) are quantified on the left axis and results of an assay for phenol 17 (using a nitroprusside-based assay) are quantified on the right axis. The filter material is Sephadex G10 (medium). Insulin passes through the filter very soon after delivery and the phenolics come out very late, only after 3 mL has passed through the filter.

FIG. 9 shows results of an experiment carried out in order to separate aspart insulin from its preservatives. A filter similar to that shown in FIG. 8 was fabricated using Sephadex medium G10 beads, 40-120 μm (GE Healthcare, Inc). Ten units of aspart insulin were placed on the column, which was 3 mm in diameter and 64 mm in length. Subsequently, 0.25 mL of PBS was delivered by an insulin pump every 5 minutes and an equal volume of eluent was collected every 5 minutes. The eluent was assayed repeatedly for insulin by using a BCA total protein assay (trace 16 in the figure). Phenol was assayed repeatedly using a nitroprusside-based assay with a spectrophotometric end point (trace17). The results show that the insulin elutes very early in the experiment with little to no more insulin coming out after the second collection. In contrast, phenol does not elute until late in the experiment after 3 mL have been collected. These results demonstrate that this embodiment works well for persons with diabetes who use an insulin pump. The insulin reservoirs for currently-available pumps contain up to 3 mL of insulin formulation. Thus, for pump users who use such a filter, the phenolics may not appear during the usage period of 3 days during which no more than 3 mL of insulin formulation can be administered.

A variation on the use of a filter material is to electrically connect to the filter material and remove interfering substances electrochemically. As an example, activated carbon filtration particles packed and immersed in a saline solution are conductive; thus the carbon can be used as an indicating electrode, polarized at 400-800 mV by a power source vs a suitable reference electrode such as a Ag/AgCl electrode. In such a case, to avoid a short circuit, the reference electrode cannot be touching the carbon and so a sheath can surround the reference electrode. The sheath prevents contact with the carbon and the saline allows electron flow to complete the anode-cathode circuit. The carbon, when suitably biased, oxidizes and electropolymerizes the phenol and m-cresol rather than allowing their passage through the filter. In such a filter, some of the phenolics may adsorb normally on to the carbon, while at the same time, other phenolics are electropolymerized to a thin layer of plastic which stays on the carbon in the disposable filter. The use of electropolymerization and adsorption is more efficient than adsorption alone.

It is important to note that there are many physical forms that the filter could take other than the single long tubular structure shown in FIG. 8. For example, it is possible for the filter to loop back on itself many times in a serpentine fashion. Such a design would not take up as much longitudinal distance.

For use in a person with diabetes, the filter can be placed anywhere in the insulin delivery line, such as in the insulin reservoir (which is usually situated with the pump body), the insulin tubing, or the insulin fluid path within the skin worn sensor module immediately proximal to the entry of the fluid into the sensing catheter.

When a filter is used, it is possible to use a higher polarizing potential bias in order that the sensing system can utilize standard sensing of hydrogen peroxide. In such a case, there is no need for a redox mediator. To optimize the signal from hydrogen peroxide oxidation, a high bias such as over 500 mV is typically used. Alternatively, one can use the filter in combination with a redox mediated system with a lower bias. Such a combination has the advantage of using two effective methods in order to markedly reduce the adverse effects of phenol and cresol during CGM.

The above description teaches the use of a filter used to remove phenolics from an insulin delivery line after the insulin formulation is placed in the pump reservoir but before insulin is pumped into a dual use sensing catheter. However, it should also be noted that such a filter can be used in a standard insulin infusion set (without a glucose sensor). It is important to note that there are many toxic effects of phenol and m-cresol. These compounds have been associated with cancer, especially bladder cancer. The US Environmental Protection Agency cites associations between phenolics administration and weight loss and neurotoxicity and has classified m-cresol as category C (possible human carcinogen). In addition, these compounds have been associated with many other adverse effects including inflammation at the site of insulin. More recently, phenolics have clearly been shown to be cytotoxic to mammalian cells.

For these reasons, many people who take insulin may decide that they do not want to be exposed to the high concentrations of phenolics that are in all formulations of insulin intended for human use. Therefore, even in the absence of a sensing catheter, the insulin infusion set with phenolics filter is a useful device applicable to those persons who use an infusion pump. For those who do not use an insulin pump, it is possible to use the same filtration materials to remove phenolics from commercial insulin formulations before administering the drug by injection.

Example 1: Redox Mediator-Based Sensing Catheter

Laminate Metal Foil to Polymer Substrate

Purpose: This step creates a laminate of titanium and polyimide (Ti/Pi). In this example, the Ti thickness is 5 µm and the polyimide thickness is 12.5 µm, though these dimensions should not be construed as limiting. This example creates a laminate rectangle whose dimensions are 60 mm×85 mm.

Materials include Deionized water; Polyimide sheet w/B-stage acrylate adhesive; Titanium foil; press pads; Teflon sheets, and graphite press plates, Heated hydraulic press capable of achieving 400 deg F;

Plate setup process: Between the caul (pressure-applying) plates of the hydraulic press, materials should be stacked in the following order, from bottom to top: Graphite press plate; press pad; Titanium foil; Polyimide, with B-stage adhesive facing titanium foil; press pad; Graphite press plate.

Prepare graphite plate, graphite foil, and Teflon sheets prior to handling polyimide and titanium. All sheets should be cut to the size of the caul plates and cleaned with isopropyl alcohol (IPA), followed by careful inspection for lint or contaminants.

For operation of the press: Place plate stack into hydraulic press and apply 5000 lb of force to caul plates. Set temperature setting to 375 deg F for both top and bottom plates. Once both caul plates reach 375 deg F, set press to 15000 lb and leave in place for 1 hour. Allow caul plates to cool to under 100 F, then remove plate stack from press.

General Equipment and Supplies (for all following steps): Double-sided polyimide tape; plastic card; razor blade; 50×75 mm glass slide; isopropyl alcohol (IPA); deionized (DI) water; Pt (platinum) target; Ag (silver) target; aluminum foil; Ar (argon) plasma etcher; quartz crystal microbalance (QCM); sputter tool; hot plate; mask aligner—e.g OAI 200 tabletop mask aligner; spin coater capable of 300 RPM; argon source.

Prepare Ti/Pi Laminate for Application of Gold and Ag Electrodes

Clean glass slide using soap and tap water, IPA wash, DI rinse, Ar plasma clean for 1 minute; dry. Place double sided polyimide tape on hot plate. Apply polyimide tape, remove bubbles. Place aluminum foil on hot plate; apply double sided polyimide on slide and place rigid backer adhesive side up. Apply Ti foil to rigid backer. Apply Ti/polyimide plus rigid backer to the polyimide tape. The stack order should be (bottom to top): glass slide, double sided polyimide tape, rigid backer, Ti/polyimide laminate with Ti side up.

Deposition of Silver Film

Purpose: To deposit a layer of Ag (later chloridized to Ag/AgCl) in order to create reference electrode. The nominal thickness is 400 nm in order to allow for a reasonable thickness of Ag/AgCl after chloridization (chloridization reduces the thickness of Ag). In this process, silver sputtering is used, but other methods such as thermal evaporation, printing, or electroplating can also be used. Materials required include: Treated 50×75 mm Ti/PI sheet on glass slide, sputter unit such as CRC-100, Ag target, and Ar compressed gas.

In order to sputter Ag layer, the substrate is placed in the sputter unit, and the vacuum pumps degas any exposed adhesive. The sputter chamber is filled with Ar, the operator allows system to equilibrate to 7 mTorr. Sputter until Quartz Crystal Microbalance (QCM) reading is 5.00 kA (500 nm) of Ag. (Gain=75, Density=10.5, Z-ratio=0.529, Tooling Factor=256). Remove device from sputter unit. Tape test in a corner with 3M Magic Scotch tape to ensure good adhesion. Store in a dust-free covered container.

Ag Patterning and Etch (Remove Unwanted Ag).

For drawings of the main microfabrication (electrode patterning) steps, see FIG. 10. Purpose—To pattern photoresist for Ag pads on Ti/PI substrate. Materials: 50×75 mm Silver sputtered Ti/PI substrate on glass slide; NaOH pellets; 300 mL beaker; 250 mL beaker; optical mask, S1813 (photoresist); 80/20 primer (80% Propylene Glycol Monomethyl Ether Acetate and 20% Hexamethyldisilazane (HMDS) primer). Materials for clean room use include the Mask aligner; Spinner; hotplate; DI water; scale; S1800 series photoresist; NaOH (pellets or solution).

First, carry out the general photoresist process that is included below. Then mix Ag etch solution. Add 75 mL of 3% USP grade H2O2, then 8 mL laboratory grade 30% ammonium hydroxide to a crystallizing dish. Immerse patterned substrate in solution for 30 seconds, gently agitating. Bubbles may not form when the reaction is complete. Rinse with DI water and blow dry with nitrogen gas or Argon. Remove photoresist with 0.3M NaOH solution.

Au Patterning, Sputtering, and Liftoff

Purpose: To pattern Au pads on Ti/PI/Ag substrate. Materials include: 50×75 mm Silver sputtered Ti/PI substrate on glass slide; NaOH pellets; 300 mL beaker; 250 mL beaker; optical mask; S1813 primer; Ti/PI/glass with Ag deposited on surface; 80/20 primer, as detailed above; Ag etch film mask; 3 mL pipette; Acetone; isopropyl alcohol (IPA); crystallizing dishes; graduated cylinder; timer.

Carry out general photoresist process that is included below. Clean under Ar for 1 minute. Activate vacuum system. Sputter 90 nm (0.900 KA) Pt. Sputter 50-90 nm of Au (Density=19.3, Z-ratio=0.381). Use Scotch tape to entirely cover the substrate. Press down firmly across the substrate, then slowly remove in order to remove Au layer. Inspect tape test sheet for any failures in Au adhesion. Use an additional piece of tape to remove any bridges between Au pads. Remove photoresist/remaining Pt/Au by tape method (3m magic tape over entire array), then sonicate in 0.5M NaOH. If any bridges remain, gently scrub using Kimwipe while in solution.

Titanium Etch (Remove Unwanted Ti in Order to Create Electrical Interconnects)

Purpose: To define and separate titanium traces on sensor. It is important to prevent titanium that underlies an indicating electrode or an indicating electrode interconnect trace from contacting titanium that underlies other indicating electrodes/traces or contacting titanium that underlies reference electrodes/traces. Materials include Ti/Pi mounted slide; titanium etchant; 400 mL beaker; crystallization dish; DI water; NaOH, Ultrasonic cleaner.

Carry out general photoresist process that is included below. Prepare etchant bath. Place substrate in etchant solution and observe closely, rinse with DI water when etch is complete.

Rinse with DI water and blow dry with nitrogen gas or argon.

Prepare Sensors for Human Use: Individualize, Wrap, Chloridize, Apply Protective Coat to Reference Electrode, and Clean Indicating Electrodes Individualize each tri-electrode strip using a mechanical or photonic technique such as UV laser (wavelength: 405 nm).

Wrap the electrode strip around a 21-25 gauge stainless steel needle (sharp bevel on end) or blunt tube. Electrode strips are wrapped axially around the needle/tube and adhered using epoxy or other biocompatible adhesive. If a blunt tube is used, a sharpened stylet within the tube is utilized in order to pierce the skin upon insertion. (The stylet is later removed, allowing drug delivery via the lumen of the tube).

Ferric chloridize with 50 mM FeCl3 for 5-10 min. ALTERNATIVE: Electrochloridize at 0.6 V×10 min using power supply configures so that the Ag is the Anode (+) and Pt is the cathode (−). Bath for electrochloridization is KCl and HCl, both 0.5 M.

Voltage cycle (clean) indicating electrodes in 1×PBS, −1.5 volts×5 min, 1.5 volts×5 min, −1.5 volts×5 min. Verify presence of evolving bubbles at sites of electrodes.

Application of redox mediator polymer and glucose oxidase to surface of gold indicating electrode. In this example, the redox mediator polymer listed is Poly-(1-vinyl)-imidazole-MRMMG-4,4'-dimethyl-2,2'-bipyridine. However, there are such compounds that can be used, either with pyridine or imidazole-based MRMMG ligands and with poly vinylpyridine, poly vinylimidazole or other polymers as the backbone. Another metal (such as ruthenium, iridium, iron, or cobalt) may be substituted in place of osmium to produce similar results.

Before beginning this step, gold tri-electrodes have been wrapped, cleaned, and chloridized.

Using DIW as a solvent, prepare 1 mL of both of the following solution: redox mediator polymer (10 mg/ml) and glucose oxidase, 100 units per mg (10 mg/ml). Combine 40 µL of the redox mediator solution and 10 uL glucose oxidase solution. When dispensed manually, one can draw up this mixture into 1 mL plastic syringe with 30 gauge needle and carefully position tip of needle over center of each of the three electrodes, then dispense a small drop (1 ul) on to each electrode without coating the reference electrode. After partial drying, one can apply a second layer of the mixture. Alternatively, one can use a microdispensing unit such as ink jet printer, being careful not to heat the enzyme to over 50 deg C.

Place the holder upright within a glutaraldehyde vapor chamber (25% glutaraldehyde) for 30 minutes, then let cure for 30 min at room temperature.

The outer membrane deposited over the entire shaft including indicating electrodes and reference electrode can be one of many glucose permeable polymers, including polyurethane, silicone, combined silicone-polyurethane, or other polymer. One effective outer membrane is Poly-(4-vinyl or 2-vinyl) pyridine co-styrene (10-30% styrene, PVP-S) 64 mg/ml, in anhydrous ethanol. One can deposit this polymer manually, by using a automated dip-coater, using an ink jet printer, micro-contact printing, or by using other precise method of dispensing. Coat the outer membrane material on the entire sensor shaft. Dry for 15 min at room temp.

After drying, it is possible to test the sensor in solutions of glucose, interfering compounds, etc.

Assemble into Electronic Module that Serves the Purposes of Telemetry and Application of Polarizing Bias Insert the sensing catheter into a battery powered telemetry module (such as a low energy Bluetooth module such as that marketed by Nordic, Inc).

For the redox mediator polymer approach discussed above, a potential bias of 180 mV is suitable. A low bias such as this largely avoids the signal artifact resulting from oxidation of insulin preservatives (phenol, m-cresol) that would be seen if a higher bias were used. A low bias also avoids the problem of electropolymerization that is routinely seen with the use of higher bias potentials. When larger bias potentials are used, the cresol and/or phenol undergo the process of electropolymerization which deposits a cohesive thin layer of insulating plastic on the electrode. This layer of plastic reduces or eliminates the ability of the member of the Redox Mediator Metal Group from communicating with the electrode materials and also reduces transport of molecules such as hydrogen peroxide to the surface of the indicating electrode.

Sterilization

Expose to e-beam, gamma irradiation, ethylene oxide or activated glutaraldehyde sterilizing solution.

Attach To Insulin Pump And Operate Device

After priming with insulin, an infusion line from an insulin pump (e.g. Medtronic Minimed, Animas Ping, Tandem t-slim, Roche Spirit, etc) is attached to the sensing catheter (which is located in subcutaneous tissue) and insulin is delivered. The constant pressure head from the fluid infusion line prevents fluids from coming back out of the body. In order to be displayed to the user, the glucose concentration or the electrical current or voltage data representing glucose concentration is obtained from the sensor. These data are transmitted by Bluetooth or other wireless protocol to the display of the insulin pump, to a computer, to a dedicated medical device, or to a cell phone. Storage of data can be carried out on any of these devices or on the body worn electronics unit that directly interfaces with the subcutaneous sensing catheter. An advantage of storing the glucose data on the body-worn unit is that the data are not lost if the receiving unit is lost or out of range.

General Photoresist Process (Common to Multiple Steps)

Materials: 50×75 mm Ti/PI substrate on glass slide; NaOH pellets or solution; 300 mL beaker; 250 mL beaker; optical mask; photoresist. 80/20 primer as defined above.

Method: Mix 200 ml 0.1M NaOH (8 g/L w/pellets or 15 mL/L w/10 M solution) primary developer in glass dish. Ensure that solution is well mixed, especially if using NaOH pellets. Mix 0.075 M NaOH secondary rinse in glass dish. Ensure that solution is well mixed. Spincoat 3 mL 80/20 primer with standard method—10 seconds @1000RM followed by 30 seconds @3000 RPM. Bake for 3 minutes @85 C. Spin coat three layers of photoresist with standard method. Bake substrate for 1 minute at 85 C between each spin step. Expose for 180s @600W. Bake for an additional 60 seconds. Develop in 0.1M NaOH developer, gently agitating. Rinse in secondary bath for 10 seconds. Dry with nitrogen gas, inspect for developed regions with remaining resist. (Exposed regions should appear uniform across the entirety of the substrate. Properly cleaned regions may gain a faintly white appearance as they go from wet to try if no photoresist remains on the surface). Bake for 10 minutes and allow to cool. If regions remain, immerse in primary and secondary baths for an additional 5 seconds and check again.

If substantial regions remain, air dry, clean with 0.3M NaOH, and return to step 4. Check process parameters.

Example 2: Filtration Using a Platinum Indicating Electrode with High Bias Potential Many aspects of this example are the same as in Example 1. However, instead of Au being deposited, Pt is deposited by sputtering, using these sputter settings: Density=10.5, and Z-ratio=0.529.

No redox mediator is used. Glucose oxidase is applied along with a protein extender, bovine serum albumin. Glutaraldehyde crosslinker is used to link the amine groups of glucose oxidase and albumin and the weight ratio of glucose oxidase:albumin:liquid glutaraldehyde is between ranging from 6:4:5 and 6:4:1. The mixture applied to the Pt electrode is dried for at least 10 min at 40° C. Additional layers can be deposited to increase sensitivity to glucose. In such a case, dry the final coat for at least 20 min. Then rinse in stirred DIW for 10-15 minutes to remove unbound enzyme. Deposit two coats of outer membrane composed of 1.5-2.5% w/v polyurethane (PU) or copolymer of silicone and polyurethane deposited on the indicating electrode(s) and reference electrode(s). Vendors such as AdvanSource Biomaterials, Lubrizol, or DSM Polymers make such polymers. The proportion of silicone is used to regulate oxygen permeation; and polyethylene oxide or poly ethylene glycol moieties or other polar moiety is used to regulate glucose permeation. A suitable solvent is a mixture of THF and DMAC (25:75, V/V). Dry each PU coat×20 min at 40 deg C. Keep solvent and polymer/solvent dry with molecular sieves 3A or 4A.

A suitable material for the filter is Sephadex G10, which is rated to separate compounds with molecular weights above 700 Da from those below 700 Da. A suitable tubular structure of approximately 3 mm in internal diameter and at least 64 mm internal length is filled with the Sephadex medium G10 beads, size 40-120 μm. The filter is placed in the fluid path of the insulin formulation. The distal end of the filter is surrounded with a porous cellulose acetate membrane for the purpose of preventing the Sephadex gel from entering the fluid path and being delivered to the patient. The pore diameter of the cellulose acetate is 0.22 μm. Before adding the insulin formulation to the filter, the filter beads are ideally exposed to an aqueous buffer such as phosphate buffer in order to swell the beads.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A device for delivery of an insulin or insulin analog formulation and measurement of subcutaneous glucose concentration, comprising:
   a hollow tube comprising a proximal end and a distal end, wherein the proximal end is in fluid communication with a source of the insulin or insulin analog formulation, wherein the distal end is configured to deliver the insulin or insulin analog formulation subcutaneously, wherein the insulin or insulin analog formulation comprises an excipient comprising a phenol or cresol; and
   an amperometric glucose sensor located no more than a pre-determined distance away from the distal end, wherein the amperometric glucose sensor comprises:
   an electrode layer comprising at least one indicating electrode, wherein the electrode layer underlies a redox-catalytic layer comprising:
   (1) a redox mediator comprising a metal compound covalently bound to a pyridine-based or imidazole-based ligand, wherein the metal compound comprises a metal selected from the group consisting of: ruthenium, palladium, platinum, rhodium, iridium, cobalt, iron, and copper, and
   (2) an enzyme comprising glucose oxidase or glucose dehydrogenase;
   wherein the redox mediator and the enzyme allow electron transfer from subcutaneous glucose to the at least one indicating electrode sufficient to cause a response of the amperometric glucose sensor to a subcutaneous glucose concentration at an applied bias potential of no more than +250 millivolts (mV) relative to a reference electrode;
   wherein the applied bias potential of no more than +250 mV relative to the reference electrode allows the electrode layer to undergo substantially no electropolymerization of the excipient during continuous operation of at least one hour of the amperometric glucose sensor, thereby maintaining a sensitivity of the amperometric glucose sensor to the subcutaneous glucose concentration in a presence of the insulin or insulin analog formulation.

2. The device of claim 1, further comprising a housing comprising an upper accessible surface and a lower surface configured to be adhered to a skin surface.

3. The device of claim 1, wherein the amperometric glucose sensor is disposed on a second hollow tube comprising a second distal end, wherein the second distal end is configured to be inserted subcutaneously.

4. The device of claim 1, wherein the ligand is 4,4'-dimethyl-2,2'-bipyridine.

5. The device of claim 1, wherein the redox mediator is bound to poly (4-vinyl pyridine) or poly (1-vinyl imidazole).

6. The device of claim 1, wherein the pre-determined distance is about 15 millimeters (mm), 14 mm, 13 mm, 12 mm, 10 mm, 10 mm, 9 mm, 8 mm, 7 mm, 6 mm, 5 mm, 4 mm, 3 mm, 2 mm, or 1 mm.

7. The device of claim 1, wherein the amperometric sensor further comprises an insulating layer and a metal layer, wherein the insulating layer is coupled to the metal layer, and wherein the metal layer is coupled to the electrode layer.

8. The device of claim 7, wherein the insulating layer comprises a polyimide or liquid crystal polymer.

9. The device of claim 1, wherein the applied bias potential is no more than about +200 mV, +150 mV, +100 mV, or +50 mV relative to the reference electrode.

10. The device of claim 9, wherein the applied bias potential of no more than about +200 mV, +150 mV, +100 mV, or +50 mV relative to the reference electrode allows the electrode layer to undergo substantially no electropolymerization of the excipient during continuous operation of at least one hour of the amperometric glucose sensor.

11. The device of claim 1, wherein the ligand comprises a heterocyclic nitrogen compound, a pyridine ring combined with an imidazole ring, a non-nitrogen element substituted into a heterocycle ring, or an accessory "R" group bound to a heterocyclic ring.

12. The device of claim 1, wherein the metal compound comprises ruthenium.

13. The device of claim 1, wherein the metal compound comprises palladium.

14. The device of claim 1, wherein the metal compound comprises platinum.

15. The device of claim 1, wherein the metal compound comprises rhodium.

16. The device of claim 1, wherein the metal compound comprises iridium.

17. The device of claim 1, wherein the metal compound comprises cobalt.

18. The device of claim 1, wherein the metal compound comprises iron.

19. The device of claim 1, wherein the metal compound comprises copper.

20. A method for delivering an insulin or insulin analog formulation and measuring a subcutaneous glucose concentration, comprising:
(a) obtaining a device for delivery of an insulin or insulin analog formulation and measurement of subcutaneous glucose concentration, wherein the device comprises:
(i) a hollow tube comprising a proximal end and a distal end, wherein the proximal end is in fluid communication with a source of the insulin or insulin analog formulation, wherein the distal end is configured to deliver the insulin or insulin analog formulation subcutaneously, wherein the insulin or insulin analog formulation comprises an excipient comprising a phenol or cresol; and
(ii) an amperometric glucose sensor located no more than a pre-determined distance away from the distal end, wherein the amperometric glucose sensor comprises:
an electrode layer comprising at least one indicating electrode, wherein the electrode layer underlies a redox-catalytic layer comprising:
(1) a redox mediator comprising a metal compound covalently bound to a pyridine-based or imidazole-based ligand, wherein the metal compound comprises a metal selected from the group consisting of: ruthenium, palladium, platinum, rhodium, iridium, cobalt, iron, and copper, and
(2) an enzyme comprising glucose oxidase or glucose dehydrogenase;
(b) connecting the proximal end of the hollow tube to the source of the insulin or insulin analog formulation;
(c) performing subcutaneous insertion of the distal end of the hollow tube into a subject; and
(d) simultaneously (1) delivering the insulin or insulin analog formulation subcutaneously to the subject and (2) measuring a subcutaneous glucose concentration of the subject, wherein the measuring comprises applying a bias potential of no more than +250 millivolts (mV) relative to a reference electrode, wherein the redox mediator and the enzyme allow electron transfer from subcutaneous glucose to the at least one indicating electrode sufficient to cause a response of the amperometric glucose sensor to the subcutaneous glucose concentration at the applied bias potential;
wherein the applied bias potential of no more than +250 mV relative to the reference electrode allows the electrode layer to undergo substantially no electropolymerization of the excipient during continuous operation of at least one hour of the amperometric glucose sensor, thereby maintaining a sensitivity of the amperometric glucose sensor to the subcutaneous glucose concentration in a presence of the insulin or insulin analog formulation.

21. The method of claim 20, wherein the device further comprises a housing comprising an upper accessible surface and a lower surface, and wherein the method further comprises adhering the lower surface to a skin surface of the subject.

22. The method of claim 20, wherein the amperometric glucose sensor is disposed on a second hollow tube comprising a second distal end, wherein the second distal end is configured to be inserted subcutaneously.

23. The method of claim 20, wherein the ligand is 4,4'-dimethyl-2,2'-bipyridine.

24. The method of claim 20, wherein the redox mediator is bound to poly (4-vinyl pyridine) or poly (1-vinyl imidazole).

25. The method of claim 20, wherein the pre-determined distance is about 15 millimeters (mm), 14 mm, 13 mm, 12 mm, 10 mm, 10 mm, 9 mm, 8 mm, 7 mm, 6 mm, 5 mm, 4 mm, 3 mm, 2 mm, or 1 mm.

26. The method of claim 20, wherein the amperometric sensor further comprises an insulating layer and a metal layer, wherein the insulating layer is coupled to the metal layer, and wherein the metal layer is coupled to the electrode layer.

27. The method of claim 26, wherein the insulating layer comprises a polyimide or liquid crystal polymer.

28. The method of claim 20, wherein the bias potential is no more than about +200 mV, +150 mV, +100 mV, or +50 mV relative to the reference electrode.

29. The method of claim 20, wherein the ligand comprises a heterocyclic nitrogen compound, a pyridine ring combined with an imidazole ring, a non-nitrogen element substituted into a heterocycle ring, or an accessory "R" group bound to a heterocyclic ring.

30. The method of claim 20, wherein the metal compound comprises ruthenium.

31. The method of claim 20, wherein the metal compound comprises palladium.

32. The method of claim 20, wherein the metal compound comprises platinum.

33. The method of claim 20, wherein the metal compound comprises rhodium.

34. The method of claim 20, wherein the metal compound comprises iridium.

35. The method of claim 20, wherein the metal compound comprises cobalt.

36. The method of claim 20, wherein the metal compound comprises iron.

37. The method of claim 20, wherein the metal compound comprises copper.

* * * * *